(12) United States Patent  (10) Patent No.: US 8,980,427 B2
Hirano et al.  (45) Date of Patent: Mar. 17, 2015

(54) CARBON FIBER BUNDLE

(75) Inventors: Noriyuki Hirano, Ehime (JP); Atsuki Tsuchiya, Ehime (JP); Masato Honma, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/515,983

(22) PCT Filed: Jan. 6, 2011

(86) PCT No.: PCT/JP2011/050069
§ 371 (c)(1),
(2), (4) Date: Jul. 13, 2012

(87) PCT Pub. No.: WO2011/089929
PCT Pub. Date: Jul. 28, 2011

(65) Prior Publication Data
US 2012/0276383 A1  Nov. 1, 2012

(30) Foreign Application Priority Data

Jan. 20, 2010 (JP) .................................. 2010-009755
Jan. 20, 2010 (JP) .................................. 2010-009756
Jan. 20, 2010 (JP) .................................. 2010-009757

(51) Int. Cl.
  *B32B 3/00* (2006.01)
  *B60C 3/04* (2006.01)
  *C08G 18/48* (2006.01)
  *C08G 18/32* (2006.01)
  *C08G 18/66* (2006.01)
  *C08G 18/76* (2006.01)
  *C08J 5/06* (2006.01)
  (Continued)

(52) U.S. Cl.
  CPC ........ *C08G 18/4833* (2013.01); *C08G 18/3221* (2013.01); *C08G 18/6674* (2013.01); *C08G 18/7621* (2013.01); *C08J 5/06* (2013.01); *D06M 15/568* (2013.01); *D06M 2101/40* (2013.01)
  USPC ............................. 428/368; 428/367; 524/495

(58) Field of Classification Search
  CPC ........................ D06M 15/568; D06M 2101/40
  See application file for complete search history.

(56) References Cited

U.S. PATENT DOCUMENTS 4,474,906 A * 10/1984 Nakama et al. ............... 523/205
5,175,025 A * 12/1992 Asano ........................... 427/227
6,911,237 B1 * 6/2005 Fry ............................. 427/389.9

FOREIGN PATENT DOCUMENTS

JP  10-266076 A  10/1998
JP  2001-003266 A  1/2001
(Continued)

OTHER PUBLICATIONS

International Search Report issued in PCT/JP2011/050069, mailed Apr. 26, 2011.

*Primary Examiner* — D Lawrence Tarazano
*Assistant Examiner* — Camie Thompson
(74) *Attorney, Agent, or Firm* — Birch, Stewart, Kolasch & Birch, LLP

(57) ABSTRACT

A carbon fiber bundle has carbon fibers and a sizing agent, wherein the sizing agent comprises a water soluble polyurethane resin having an SP value of 11.2 to 13.3, and the sizing agent is deposited on the carbon fibers at a rate of 0.5 to 7% by mass. In another carbon fiber bundle, the sizing agent is composed of the component shown in (A) and the component shown in (B1) or (B2) below, and the sizing agent is deposited on the carbon fibers at a rate of 0.5 to 7% by mass: (A) 73 to 98% by mass of a polyoxyalkylene unit; (B1) 0.5 to 15% by mass of an aromatic ester unit, 1.5 to 10% by mass of an aromatic urethane unit; and (B2) 0.5 to 10% by mass of an aromatic ester unit, 1.5 to 11% by mass of an aliphatic urethane unit.

15 Claims, 1 Drawing Sheet

(51) Int. Cl.
   D06M 15/568    (2006.01)
   *D06M 101/40*    (2006.01)

(56)         References Cited

FOREIGN PATENT DOCUMENTS

| JP | 2002-220786 A | 8/2002 |
| JP | 2003-247127 | * 9/2003 |
| JP | 2003-247127 A | 9/2003 |
| JP | 2004-011030 | * 1/2004 |
| JP | 2004-244531 A | 9/2004 |
| JP | 2004-360164 | * 12/2004 |
| JP | 2005-320641 A | 11/2005 |
| JP | 2006-144168 A | 6/2006 |

* cited by examiner

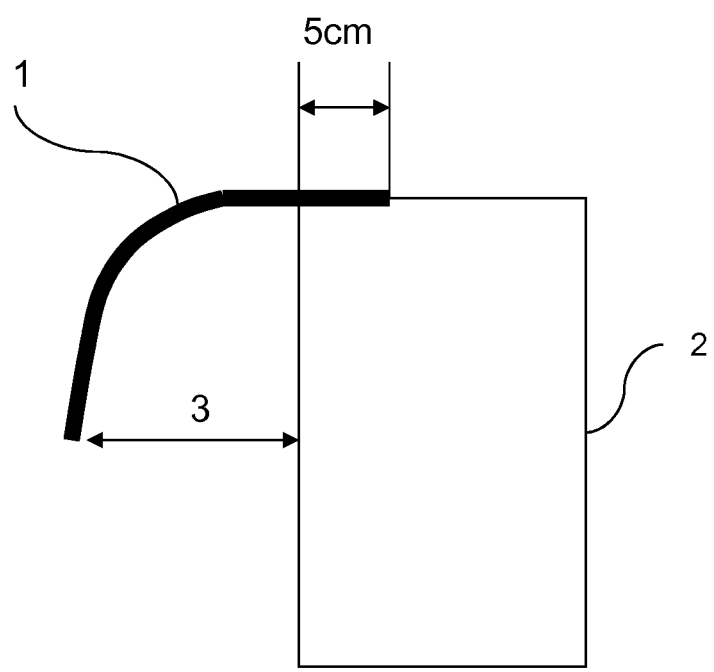

CARBON FIBER BUNDLE

TECHNICAL FIELD

The present invention relates to a carbon fiber bundle having processability into a chopped fiber, a convergence property suitable for handling of the chopped fiber, and dispersibility suitable for water-mediated processes represented by a paper making process.

BACKGROUND ART

A carbon fiber reinforced composite material, which is a composite of carbon fibers and a matrix resin, has been used in a wide range of fields including automobiles, aircrafts, electrical and electronic equipment, optical instruments, sports equipment, and building materials because it has excellent lightness, mechanical property, conductivity, dimensional stability, and the like.

A number of methods of forming a carbon fiber composite material are known, and examples of the method for obtaining a substrate used in the formation include a method involving processing carbon fibers using an aqueous process represented by a wet paper making process. For example, chopped fibers are processed into paper or a nonwoven fabric by dispersing them in an aqueous medium, and then a composite material substrate is obtained using various resins as a base material. For example, an electrode substrate for a fuel cell is produced by this paper making process.

In a wet paper making process, paper is made by dispersing chopped fibers in an aqueous dispersion medium. For improving the quality of paper to be obtained, carbon fibers' convergence property and dispersibility in the aqueous dispersion medium are required. Convergence property is important for equalization of fiber length upon cutting and workability in feeding of a chopped fiber. Dispersibility is a property for fiber bundles to be dispersed at a single fiber level and directly influences the paper quality. The more excellent the carbon fiber bundle's convergence property and dispersibility, the more the mechanical property and electrical conductive properties of the carbon fiber reinforced composite material improve.

From such a background, in the carbon fiber bundle used in an aqueous process, a particular resin is generally deposited as a sizing agent to improve the convergence property and dispersibility.

PRIOR ART DOCUMENTS

Patent Documents

Patent Document 1 discloses a carbon fiber for an aqueous process on which a sizing agent mainly composed of a surface active agent is deposited. Patent Document 2 discloses a carbon fiber for paper making on which a hydrophilic compound comprising polyoxyalkylene and aliphatic hydrocarbon is deposited as a sizing agent. Further, Patent Document 3 discloses a carbon fiber on which a sizing agent comprising a surface active agent having an HLB (hydrophile-lipophlie balance) value of 9 to 17 and a polyvinyl alcohol type water soluble thermoplastic resin is deposited.

Urethane resins are often used as a sizing agent for fibers because they have excellent elasticity, toughness, adhesiveness, and the like. For example, Patent Document 4 discloses a carbon fiber bundle that uses a polyether polyurethane resin or a polyester polyurethane resin as a sizing agent.

Patent Document 5 discloses a carbon fiber chopped strand that uses a mixture of aromatic polyurethane and non-aromatic polyurethane as a sizing agent and has excellent handleability, mechanical properties of a composite material, and conductivity.

Further, a carbon fiber bundle in which a sizing agent having a particular solubility parameter (SP value) is deposited on carbon fibers is disclosed in Patent Document 6. The use of a sizing agent having an SP value in a particular range has improved the adhesiveness to a rubber-containing resin.

Patent Document 1: WO 2006/019139
Patent Document 2: JP 2006-219808 A
Patent Document 3: JP 2000-54269 A
Patent Document 4: JP 2007-231441 A
Patent Document 5: JP 2003-165849 A
Patent Document 6: JP 2003-247127 A

SUMMARY OF THE INVENTION

Problems to Be Solved by the Invention

However, it is not easy to simultaneously achieve a convergence property and dispersibility by the techniques of Patent Documents 1 to 3, and particularly when the carbon fiber concentration in an aqueous dispersion medium is increased to obtain paper having a high fabric weight, there has been a problem in that the mechanical property of the formed product cannot be fully exerted because of a degraded substrate due to insufficient dispersibility of fibers or reaggregation.

In the fiber bundle of Patent Document 4, the adhesiveness to a thermoplastic resin has been improved by deposition of a polyester polyurethane resin having an elongation after fracture of not more than 400%, but it is not disclosed or suggested that the fiber bundle of Patent Document 4 exhibits excellent properties in an aqueous process.

Further, it is not disclosed or suggested that the carbon fiber chopped strand of Patent Document 5 exhibits excellent properties in an aqueous process.

Further, it is not disclosed or suggested that the carbon fiber bundle provided with a sizing agent of Patent Document 6 exhibits excellent properties in an aqueous process.

As described above, there is a need for a carbon fiber bundle having a balance between convergence property and dispersibility in an aqueous dispersion medium. A carbon fiber reinforced composite material has more excellent mechanical property and conductivity with increasing amount of carbon fibers, and therefore a more excellent substrate can be obtained if the carbon fiber reinforced composite material can be processed at a high carbon fiber concentration. Further, handleability during the production and processing of a fiber bundle is also of importance, and winding around a bobbin and workability during processing are the properties that a fiber bundle always requires.

An object of the present invention is to provide a carbon fiber bundle having good handleability during the production and processing of the fiber bundle, an excellent convergence property, and excellent dispersibility in an aqueous dispersion medium even at a high concentration.

Means for Solving the Problems

The present inventors intensively studied in order to achieve the object above to discover the following carbon fiber bundle that is able to solve the above-described problems. The present invention has two aspects shown below.

The first aspect is a carbon fiber bundle having carbon fibers and a sizing agent, wherein the sizing agent comprises a water soluble polyurethane resin having an SP value of 11.2 to 13.3, and the sizing agent is deposited on the carbon fibers at a rate of 0.5 to 7% by mass.

The second aspect is a carbon fiber bundle having carbon fibers and a sizing agent, wherein the sizing agent comprises a polyurethane resin composed of the component shown in (A) and the component shown in (B1) or (B2) below, and the sizing agent is deposited on the carbon fibers at a rate of 0.5 to 7% by mass:

(A) 73 to 98% by mass of a polyoxyalkylene unit;
(B1) 0.5 to 15% by mass of an aromatic ester unit, 1.5 to 10% by mass of an aromatic urethane unit; and
(B2) 0.5 to 10% by mass of an aromatic ester unit, 1.5 to 11% by mass of an aliphatic urethane unit.

In the carbon fiber bundle of the present invention, the above-described polyurethane resin is preferably composed of 85 to 97% by mass of a polyoxyalkylene unit, 0.8 to 9% by mass of an aromatic ester unit, and 2.3 to 6.5% by mass of an aromatic urethane unit.

In the sizing agent comprising a polyurethane resin that is used in the carbon fiber bundle of the present invention, the polyurethane resin is preferably composed of 89 to 94% by mass of a polyoxyalkylene unit, 3 to 6% by mass of an aromatic ester unit, and 3 to 5% by mass of an aromatic urethane unit.

In the sizing agent comprising a polyurethane resin that is used in the carbon fiber bundle of the present invention, the aromatic urethane unit preferably comprises tolylene diisocyanate.

In the sizing agent comprising a polyurethane resin that is used in the carbon fiber bundle of the present invention, the thermal weight loss after 15 minutes at 230° C. is preferably not more than 30%.

In the sizing agent comprising a polyurethane resin that is used in the carbon fiber bundle of the present invention, the polyurethane resin is preferably composed of 78 to 98% by mass of a polyoxyalkylene unit, 2.5 to 9% by mass of an aromatic ester unit, and 4.5 to 8.5% by mass of an aliphatic urethane unit.

In the sizing agent comprising a polyurethane resin that is used in the carbon fiber bundle of the present invention, the polyurethane resin is preferably composed of 83 to 97% by mass of a polyoxyalkylene unit, 3 to 6% by mass of an aromatic ester unit, and 4.5 to 6.5% by mass of an aliphatic urethane unit.

In the sizing agent comprising a polyurethane resin that is used in the carbon fiber bundle of the present invention, the above-described aliphatic urethane unit preferably comprises isophorone diisocyanate.

In the carbon fiber bundle of the present invention, the above-described polyoxyalkylene unit preferably comprises a polyalkylene glycol having a weight-average molecular weight from 4,000 to 21,000.

In the sizing agent comprising a polyurethane resin that is used in the carbon fiber bundle of the present invention, the above-described polyoxyalkylene unit preferably comprises polyethylene glycol.

In the sizing agent comprising a polyurethane resin that is used in the carbon fiber bundle of the present invention, the above-described aromatic ester unit preferably comprises bis(2-hydroxyethyl)terephthalate or bis(2-hydroxyethyl)isophthalate.

The carbon fiber bundle of the present invention preferably has a drape value of 2 to 20 cm.

In the carbon fiber bundle of the present invention, the carbon fiber bundle preferably comprises 1,000 to 60,000 single fibers.

In the carbon fiber bundle of the present invention, the carbon fiber bundle is preferably a chopped fiber having a fiber length of 1 to 20 mm.

Effects of the Invention

The carbon fiber bundle of the present invention has excellent handleability during the production and processing of the fiber bundle and further has a balance between the fibers' convergence property and dispersibility in an aqueous dispersion medium, and even when the carbon fiber concentration is increased, the carbon fiber bundle of the present invention achieves uniform dispersion at a single fiber level and provides a substrate for paper having excellent mechanical property and conductivity.

BRIEF DESCRIPTION OF THE DRAWING

FIG. 1 is a schematic view that illustrates a method for measuring the drape value of a carbon fiber bundle.

BEST MODE FOR CARRYING OUT THE INVENTION

First, the constituents of the carbon fiber bundle of the present invention will be described.

[Carbon Fiber]

As a carbon fiber, a PAN-based, pitch-based, rayon-based carbon fiber, and the like can be used, and a PAN-based carbon fiber is preferred from the standpoint of the balance between the strength and the modulus of a formed product to be obtained. These are available as a commercial product. For enhancing the deposition on a sizing agent to form a uniform film, the carbon fiber may be subjected to a surface treatment. Examples of the surface treatment include chemical oxidation and electrolytic oxidation in liquid phase and gas phase oxidation, and the electrolytic oxidation in which carbon fibers are oxidized in an aqueous electrolyte solution as an anode is preferred because it is convenient and decreases strength reduction. Examples of electrolytic treatment solutions include, but are not limited to, inorganic acids such as sulfuric acid and nitric acid, inorganic bases such as potassium hydroxide and sodium hydroxide, and inorganic salts such as ammonium sulfate, ammonium carbonate, and sodium carbonate.

A carbon fiber bundle refers to a converged form of single fibers (filaments) of carbon fibers, and the number of the filaments is generally about 1,000 to 60,000, preferably 3,000 to 40,000 from the standpoint of the handleability and dispersibility of carbon fibers, and more preferably 6,000 to 24,000.

The diameter of the carbon fibers (filaments) constituting the carbon fiber bundle is preferably 3 to 15 µm and more preferably 5 to 10 µm.

The carbon fiber bundle of the present invention may contain a small amount of other types of fibers as long as the object of the invention is not impaired. Examples of other types of fibers include, for example, high-strength and high-modulus fibers such as carbon fibers, glass fibers, aramid fibers, alumina fibers, silicon carbide fibers, boron fibers, and metal fibers, one or more of which may be contained.

[Sizing Agent]

In the first aspect of the present invention, the sizing agent comprises a water soluble polyurethane resin, and the water soluble polyurethane resin is composed of polyol units and urethane units. The water soluble polyurethane resin can be obtained by condensing diisocyanates with polyols; the polyols constitute the polyol unit, and the diisocyanates constitute the urethane unit. From the standpoint of achieving water solubility, polyalkylene glycol needs to be contained as a polyol. Further, as a polyol, in addition to polyalkylene glycol, one or more selected from polyester polyol, polycaprolactone polyol, and polycarbonate polyol can be used in combination. The condensation of diisocyanates with polyols is a polyaddition (addition polymerization) reaction and not accompanied by generation and separation of small molecules, and therefore the mass ratio of the polyol units and urethane units constituting the sizing agent of the present invention reflects the mass ratio of the materials constituting each unit. In other words, the mass % of each unit in the present invention is the mass % of each material based on the total mass of the materials polyols and diisocyanates. The mass % of the polyols is preferably 94 to 99.2% by mass.

The polyalkylene glycol that can be used in the first aspect of the present invention needs to be hydrophilic in order for the carbon fiber bundle to exhibit high dispersibility in an aqueous dispersion medium, examples of which include, for example, polyethylene glycol (PEG), polypropylene glycol (PPG), PEG/PPG block copolymer, and PEG/PPG random copolymer. Among them, polyethylene glycol is preferred. In particular, from the standpoint of the balance of the carbon fiber bundle's handleability, convergence property, and dispersibility in an aqueous dispersion medium, the weight-average molecular weight of the polyalkylene glycol is preferably from 4,000 to 21,000. The polyalkylene glycol component changes in hydrophilicity and flexibility of a film depending on the molecular weight. When the molecular weight is in an appropriate range, a sizing agent having more excellent convergence property and handleability while exhibiting high dispersibility can be obtained.

The polyalkylene glycol component can also be used as a mixture of plural types of polyalkylene glycol components having different weight-average molecular weights. The weight-average molecular weight of the polyalkylene glycol in such a case can be determined by the equation below.

$$Mw = \frac{W_1}{\sum W_n}Mw_1 + \frac{W_2}{\sum W_n}Mw_2 + \ldots + \frac{W_n}{\sum W_n}Mw_n \quad \text{[Mathematical formula 1]}$$

In the equation, Mw represents the weight-average molecular weight, and W represents the mass % of the polyalkylene glycol component.

Further, as a polyol component, in addition to polyalkylene glycol, one or more selected from polyester polyol, polycaprolactone polyol, and polycarbonate polyol can be used in combination.

Polyester polyol can be obtained by dehydration reaction of glycols and carboxylic acids. Examples of glycols that can be used in dehydration reaction include, for example, ethylene glycol, propylene glycol, 1,4-butanediol, neopentyl glycol, diethylene glycol, and 1,4-cyclohexane diol. Examples of dicarboxylic acid components include, for example, adipic acid, succinic acid, azelaic acid, sebacic acid, phthalic acid, terephthalic acid, isophthalic acid, diphenic acid, ubido acid, 2-methyl terephthalic acid, 4-methyl phthalic acid, and naphthalenedicarboxylic acid.

Polycaprolactone polyol is a polyol comprising ε-caprolactone and various alcohols as a material. For example, Polylite OD-X-2155, OD-X-640, OD-X-2586 available from DIC CORPORATION, PRAXEL 205, 210, 220, 303, 305 available from Daicel Chemical Industries, Ltd. and the like are available as a commercial product.

Polycarbonate polyol is a polyol having a carbonate structure in the molecular chain. For example, PRAXEL CD205, CD210, CD220 available from Daicel Chemical Industries, Ltd. and the like are available as a commercial product.

Further, other compounds having hydroxyl groups other than water can be contained as long as the handleability, convergence property, and dispersibility of the sizing agent are not impaired. Examples of such compounds include, for example, ethylene glycol, propylene glycol, butylene glycol, glycerin, pentaerythritol, trimethylolpropane, sorbitol, catechol, bisphenol A, and the like.

Examples of the diisocyanate that can be used in the first aspect of the present invention include phenyl diisocyanate, methylenediphenylene diisocyanate, tolylene diisocyanate, xylylene diisocyanate, hexamethylene diisocyanate, isophorone diisocyanate, naphthalene diisocyanate, dimeric acid diisocyanate, norbornene diisocyanate, dicyclohexylmethane diisocyanate, and the like. From the standpoint of flexibility and toughness of a film, tolylene diisocyanate or isophorone diisocyanate is preferred.

As described above, in the present invention, the urethane unit constituting the polyurethane resin used in the sizing agent is preferably composed of tolylene diisocyanate or isophorone diisocyanate, and "comprises tolylene diisocyanate or isophorone diisocyanate" described herein means that the amount of the diisocyanate component is 90% by mass or more of the total diisocyanate components.

The sizing agent used in the second aspect of the present invention can be obtained by condensing diisocyanates with polyalkylene glycols and polyols containing aromatic ester. The polyols containing aromatic ester are those which are obtained by dehydration reaction of glycol components and aromatic dicarboxylic acid components. As a result of the condensation of diisocyanates with polyalkylene glycols and polyols containing aromatic ester, diisocyanates constitute the urethane unit, polyalkylene glycols the polyoxyalkylene unit, and polyols having aromatic ester the aromatic ester unit.

The condensation of isocyanates with alcohols is a polyaddition (addition polymerization) reaction and not accompanied by generation and separation of small molecules, and therefore the mass ratio of the polyoxyalkylene units, aromatic ester units, and urethane units constituting the sizing agent of the present invention reflects the mass ratio of the materials constituting each unit. In other words, the mass % of each unit in the present invention is the mass % of each material based on the total mass of the above-described three materials.

Similarly to the above-described polyalkylene glycol that can be used in the first aspect of the present invention, the polyalkylene glycol that can be used in the second aspect of the present invention needs to be hydrophilic in order for the carbon fiber bundle to exhibit high dispersibility in an aqueous dispersion medium, examples of which include, for example, polyethylene glycol (PEG), polypropylene glycol (PPG), PEG/PPG block copolymer, and PEG/PPG random copolymer. Among them, polyethylene glycol is preferred.

Further, other compounds having hydroxyl groups other than water can be contained as long as the handleability, convergence property, and dispersibility of the sizing agent are not impaired. Examples of such compounds include, for example, ethylene glycol, propylene glycol, butylene glycol, glycerin, pentaerythritol, trimethylolpropane, sorbitol, catechol, bisphenol A, and the like.

As mentioned above, in the present invention, the polyoxyalkylene unit constituting the polyurethane resin used in the sizing agent is preferably composed of polyethylene glycol, and "comprises polyethylene glycol" described herein means that the amount of the polyethylene glycol is 90% by mass or more of the total alkylene glycol components.

From the standpoint of the balance of the carbon fiber bundle's handleability, convergence property, and dispersibility in an aqueous dispersion medium, the weight-average molecular weight of the polyalkylene glycol is preferably from 4,000 to 21,000. The polyalkylene glycol component changes in hydrophilicity and flexibility of a film depending on the molecular weight. When the molecular weight is in an appropriate range, a sizing agent having more excellent convergence property and handleability while exhibiting high dispersibility can be obtained.

The polyalkylene glycol component can also be used as a mixture of plural types of polyalkylene glycol components having different weight-average molecular weights. The weight-average molecular weight of the polyalkylene glycol in such a case can be determined by the equation mentioned above.

The polyols containing aromatic ester can be obtained by dehydration reaction of glycols and aromatic carboxylic acids. Examples of glycols that can be used in dehydration reaction include, for example, ethylene glycol, propylene glycol, 1,4-butanediol, neopentyl glycol, diethylene glycol, and 1,4-cyclohexane diol. Examples of aromatic dicarboxylic acid components include, for example, phthalic acid, terephthalic acid, isophthalic acid, diphenic acid, ubido acid, 2-methyl terephthalic acid, 4-methyl phthalic acid, and naphthalenedicarboxylic acid. Ethylene glycol is preferred as a glycol component, and terephthalic acid or isophthalic acid is preferred as an aromatic dicarboxylic acid component because a sizing agent having an excellent balance between convergence property and dispersibility can be obtained. Therefore, as a polyol containing aromatic ester, a condensate thereof, bis(2-hydroxyethyl)terephthalate or bis(2-hydroxyethyl) isophthalate is preferred.

Further, other glycols, aromatic carboxylic acids, and dehydration reactants thereof can be contained as long as the handleability, convergence property, and dispersibility of the sizing agent are not impaired. Examples of such compounds include, for example, the glycol and aromatic carboxylic acid components described above that can be used for obtaining polyols containing aromatic ester.

As mentioned above, the aromatic ester unit constituting the present invention is preferably composed of bis(2-hydroxyethyl)terephthalate or bis(2-hydroxyethyl)isophthalate, and "comprises bis(2-hydroxyethyl)terephthalate or bis (2-hydroxyethyl)isophthalate" described herein means that the amount of the aromatic ester component is 90% by mass or more of the total aromatic ester components.

The diisocyanate that can be used in the second aspect of the present invention includes aromatic diisocyanates and aliphatic diisocyanates. Aromatic diisocyanates mean diisocyanates containing an aromatic ring in the structure and constitute the aromatic urethane unit as a result of condensation. Examples of aromatic diisocyanates include phenyl diisocyanate, methylenediphenylene diisocyanate, tolylene diisocyanate, xylylene diisocyanate, and the like. Tolylene diisocyanate is preferred because a film having more excellent flexibility and toughness can be obtained.

As described above, in the present invention, the aromatic urethane unit constituting the polyurethane resin used in the sizing agent is preferably composed of tolylene diisocyanate, and "comprises tolylene diisocyanate" described herein means that the amount of the tolylene diisocyanate is 90% by mass or more of the total aromatic diisocyanate components.

In the present invention, the aliphatic diisocyanates constituting the polyurethane resin used in the sizing agent mean diisocyanates having linear or branched alkyl or cycloalkyl as the main skeleton. Examples of the aliphatic diisocyanates include hexamethylene diisocyanate, isophorone diisocyanate, dicyclohexylmethane diisocyanate, trimethylhexamethylene diisocyanate, hydrogenated xylylene diisocyanate, norbornene diisocyanate, and the like. From the standpoint of flexibility and toughness of a film, isophorone diisocyanate is preferred.

As described above, in the present invention, the aliphatic urethane unit constituting the polyurethane resin used in the sizing agent is preferably composed of isophorone diisocyanate, and "comprises isophorone diisocyanate" described herein means that the amount of the isophorone diisocyanate is 90% by mass or more of the total aromatic diisocyanate components.

[Sizing Agent-deposited Carbon Fiber Bundle]

In the first aspect of the present invention, in order for the carbon fiber bundle to exhibit high dispersibility in an aqueous dispersion medium even at high concentration, it is important for the sizing agent to be water soluble and have an SP value in the range of 11.2 to 13.4. "Water soluble" herein refers to being "dissolved" in water at the molecular level, i.e., forming a homogeneous liquid phase. As a polyurethane-based sizing agent, as described, for example, in Patent Document 4, those obtained by dispersing a polyurethane resin in water are widely used. Specifically, a polyurethane resin is emulsified by self-emulsification or with a surface active agent. "Emulsification" herein refers to a phenomenon in which one of two liquids insoluble in each other is dispersed as small particles in the other liquid to form an emulsion (Glossary of Technical Terms in Japanese Industrial Standards, 3rd Ed., Japanese Standards Association, p-1352). In other words, the state in which a polyurethane resin is "emulsified" in water and the state in which the polyurethane resin is "dissolved" in water are completely different.

In the case of a polyurethane-based sizing agent obtained by emulsification in water, since polyurethane itself has low affinity for water, the carbon fiber bundle exhibits little or no dispersibility even if it is treated in an aqueous dispersion medium after forming a film on the surface. For exhibiting good dispersibility, it is important that the sizing agent and water show compatibility, and it is necessary to use a water soluble polyurethane-based sizing agent.

On the other hand, in cases where a sizing agent having high water solubility, such as, for example, a surface active agent, is deposited on a carbon fiber, the quality degrades particularly when making paper with high fabric weight because too fast dissolution of the sizing agent in water results in deficient dispersibility or because the quick loss of the sizing agent from the carbon fiber surface results in reaggregation. In other words, for making paper with higher fabric weight, it is important that the water solubility of a sizing agent be appropriately controlled.

SP value (solubility parameter), which is defined as the square root of the heat of vaporization per volume, is a numerical value used as an index of the solubility of two components. The smaller the difference in SP values between the two components, the higher the solubility. In the carbon fiber bundle of the present invention, when the SP value of a water soluble polyurethane resin is in the range of 11.2 to 13.4, the water solubility is appropriately controlled, and high dispersibility is exhibited. The value is preferably 12.3 to 13.3. Outside this range, the water solubility is deficient or too high, whereby the dispersibility decreases.

In the present invention, the SP value is calculated by Fedors' method (Polymer Engineering and Science, vol. 14, No. 2, p-147 (1974)). For example, the SP value of the polyurethane resin represented by the following chemical formula is calculated as described below.

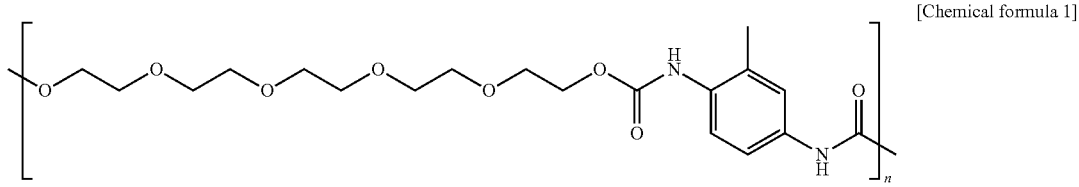

[Chemical formula 1]

In the polyurethane resin represented by the above chemical formula, one methyl group (—CH$_3$), ten methylene groups (—CH$_2$—), six ethers (—O—), two amides (—CONH—), and one phenylene are contained in its repeating unit. The molar heat of vaporization Δei and molar volume Δvi of each unit are each as described in Table 1 according to the above-described reference.

TABLE 1

| Unit | Mole heat of vaporization Δei (cal/mol) | Molar volume Δvi (cm$^3$/mol) | Unit numbers per repeating unit | Σ Δei (cal/mol) | Σ Δvi (cm$^3$/mol) |
|---|---|---|---|---|---|
| CH$_3$ | 1125 | 33.5 | 1 | 1125 | 33.5 |
| CH$_2$ | 1180 | 16.1 | 10 | 11800 | 161 |
| O | 800 | 3.8 | 6 | 4800 | 22.8 |
| CONH | 8000 | 9.5 | 2 | 16000 | 19 |
| phenylene | 7630 | 52.4 | 1 | 7630 | 52.4 |
| Sum total | | | | 41355 | 288.7 |

The SP value is represented by the equation below.

$$\delta(SP\ value) = \sqrt{\frac{\Sigma \Delta ei}{\Sigma \Delta vi}}$$

[Mathematical formula 2]

Since the values of ΣΔei and ΣΔvi are as shown in Table 1, the SP value can be determined by fitting each value to the above equation to be 11.969.

In the second aspect of the present invention, the component ratio of the polyoxyalkylene unit to the aromatic ester unit to the urethane unit, which are the components constituting a polyurethane resin, is important for simultaneously achieving the convergence property and dispersibility of the carbon fiber bundle. The polyoxyalkylene unit provides a sizing agent with hydrophilicity to improve the dispersibility of the carbon fiber bundle in an aqueous dispersion medium. The content of the polyoxyalkylene unit necessary to improve dispersibility is 73 to 98% by mass based on the total mass of each unit regardless of the structure of the urethane unit.

When the content is less than this lower limit, the hydrophilicity of the sizing agent is deficient, whereby a dispersion itself of the sizing agent cannot be produced, or sufficient dispersibility in the aqueous dispersion medium is not exhibited. When above this upper limit, handleability and convergence property are deficient.

The polyoxyalkylene unit content preferred to improve dispersibility varies depending on the structure of the urethane unit. In the case where the urethane unit is composed of aromatic urethane, the content is preferably 85 to 97% by mass and more preferably 89 to 94% by mass.

In the case where the urethane unit is composed of aliphatic urethane, the polyoxyalkylene unit content preferred to improve dispersibility is preferably 78 to 98% by mass, more preferably 83 to 97%, and still more preferably 88 to 92%, based on the total mass of each unit.

The aromatic ester unit improves heat resistance and convergence property of the carbon fiber bundle. The aromatic ester unit content necessary to improve dispersibility varies depending on the structure of the urethane unit.

In the case where the urethane unit is composed of aromatic urethane, it is necessary to contain the aromatic ester unit in an amount of 0.5 to 15% by mass based on the total mass of each unit. When the amount is less than this lower limit, the reduced heat resistance of the carbon fiber bundle affects the process passability, or the convergence property decreases. When above this upper limit, sufficient dispersibility is not exhibited because of deficient hydrophilicity of the sizing agent. The amount is preferably 0.8 to 9% by mass and more preferably 3 to 6% by mass.

In the case where the urethane unit is composed of aliphatic urethane, the content of the aromatic ester unit needs to be 0.5 to 10% by mass based on the total mass of each unit. The content is preferably 2.5 to 9% by mass and more preferably 3 to 6% by mass.

The urethane unit makes a film formed on the carbon fiber surface flexible and tough and improves handleability and convergence property.

In the case where the urethane unit is composed of aromatic urethane, the content of the aromatic urethane unit needs to be 1.5 to 10% by mass based on the total mass of each unit. When the content is less than this lower limit, the flexibility and toughness of the sizing agent are lost, resulting in a fragile film, which decreases the handleability and convergence property. When above this upper limit, sufficient dispersibility is not exhibited because of deficient hydrophilicity of the sizing agent. The amount is preferably 2.3 to 6.5% by mass and more preferably 3 to 5% by mass.

In the case where the urethane unit is composed of aliphatic urethane, the content of the aliphatic urethane unit needs to be 1.5 to 11% by mass based on the total mass of each unit. When the content is less than this lower limit, the flexibility and toughness of the sizing agent are lost, resulting in a fragile film, which decreases the handleability and convergence property. When above this upper limit, sufficient dispersibility is not exhibited because of deficient hydrophilicity of the sizing agent. The amount is preferably 4.5 to 8.5% by mass and more preferably 4.5 to 6.5% by mass.

As described above, in order for the carbon fiber bundle to exhibit good handleability, convergence property, and dispersibility, it is important that the polyoxyalkylene unit, the aromatic ester unit, and the urethane unit be contained at a particular constitution ratio. The constitution ratio of these units can be measured, for example, from the absorption wavelength and strength of IR spectra as well as from the weight ratio of the materials. For example, the polyoxyalkylene unit, the aromatic ester unit, and the aromatic urethane unit shows a characteristic absorption at 1070 to 1150 cm$^{-1}$ (C—O—C stretch), at 1717 to 1750 cm$^{-1}$ (ester C=O stretch), and at 1690 to 1720 cm$^{-1}$ (urethane C=O stretch), respectively, and therefore the constitution ratio of the polyoxyalkylene unit to the aromatic ester unit to the urethane unit can be determined, for example, from the absorption rates.

[Additives]

In the present invention, regardless of whether it is the first aspect or the second aspect, a small amount of other units may be included in the component of the polyurethane resin used in the sizing agent as long as the object of the present invention is not impaired. Examples of the other units include, for example, low-molecular-weight alkylene glycol, cyclohexane diol, polyamine such as hexamethylenediamine, and the like.

Further, the sizing agent used in the present invention may contain defoaming agents, emulsifiers, rot proof agents, slimicides, crosslinking agents, antioxidants, heat stabilizers, and components such as epoxy resins, acrylic resins, and various thermoplastic resins as long as the object of the present invention is not impaired. Known sizing agents can also be added.

[Method of Preparing Sizing Agent]

In the first aspect of the present invention, a sizing agent can be obtained, for example, by adding diisocyanate to a polyol component to allow the polyaddition (addition polymerization) reaction to proceed.

The sizing agent used in the second aspect of the present invention can be obtained, for example, by the following method. Specifically, an aromatic dicarboxylic acid and an alkylene glycol are heated for dehydration reaction to produce a polyol containing aromatic ester, to which a polyalkylene glycol is added and cooled to an appropriate temperature, and then a diisocyanate is added to allow the polyaddition (addition polymerization) reaction to proceed, whereby the sizing agent of interest can be obtained.

In the present invention, regardless of whether it is the first aspect or the second aspect, it is important that the deposition amount of a sizing agent on the carbon fiber be in the range of 0.5 to 7% by mass based on 100% by mass of the carbon fiber bundle from the standpoint of the balance between convergence property and dispersibility. If the deposition amount is less than this lower limit, the film formation will be insufficient, and the convergence property and dispersibility of the carbon fiber bundle will be deficient. If above this upper limit, the handleability will be insufficient because the fiber bundle becomes hard, which is disadvantageous in terms of cost. The amount is preferably 1 to 5% by mass and more preferably 1.2 to 3% by mass.

Sizing treatment of carbon fibers is generally carried out by drying and removing a dispersion medium after immersing a continuous carbon fiber bundle in a solution or a dispersion of a sizing agent in an aqueous medium (a sizing liquid) or after dropping, sprinkling, or spraying a sizing liquid on carbon fibers.

In the second aspect of the present invention, a carbon fiber bundle using aromatic ester as an ester unit and aromatic urethane as a urethane unit has more excellent convergence property and dispersibility when drying temperature is 180° C. or more. Although the reason is not clear, this is probably because the sizing agent from which the volatile matter has been removed exhibits fluidity and covers the fibers uniformly. For increasing the temperature during a drying process, the sizing agent needs to contain the aromatic ester unit and the aromatic urethane unit. The aromatic ester unit and the aromatic urethane unit improve the heat resistance of the sizing agent to suppress thermal decomposition during the drying process. If the aromatic ester unit is not contained, the thermal decomposition of the sizing agent proceeds, resulting in uneven formation of films, and therefore the convergence property and dispersibility decrease.

The heat resistance of the sizing agent can be determined by thermogravimetry (TG) of the pure sizing agent. Thermogravimetry is measurement of weight change after a sample has been allowed to stand under particular temperature conditions, and the weight loss increases with proceeding thermal decomposition due to deficient heat resistance. If the thermal weight loss of the sizing agent upon treatment at 230° C. for 15 minutes is not more than 30%, thermal decomposition can be suppressed even in the temperature range during the drying process described above, and a higher convergence property can be obtained.

When the carbon fiber bundle of the present invention is used in a paper making process, a chopped fiber obtained by cutting a roving, which is a continuous fiber on which the above-described sizing agent is deposited, with a known cutting machine such as a guillotine cutter is used. Although the length of the chopped fiber is not restricted, it is preferable to cut to about 1 to 20 mm. When the cut length is in this range, a substrate having an excellent balance among workability in paper making, mechanical property, and electrical conductive properties can be obtained.

Further, the sizing agent used in the present invention maintains its dispersibility even when the concentration of carbon fibers in an aqueous dispersion medium is high and is able to prevent reaggregation of the single fibers once dispersed. It is thought that excellent dispersibility has been expressed because the sizing agent exhibits high affinity for the aqueous dispersion medium and at the same time has an excellent affinity for the carbon fibers. In other words, it is thought that excellent dispersibility has been expressed because the polyoxyalkylene unit, which is hydrophilic, and the aromatic ester unit and the aromatic urethane unit, which are hydrophobic, constitute a polyurethane resin at an appropriate ratio, whereby the balance between the hydrophilicity of the polyoxyalkylene unit and the affinity of the aromatic ester unit and the aromatic urethane unit for carbon fibers is well controlled.

EXAMPLES

The present invention will now be described in more detail by way of examples.

Methods for measuring the various properties of the carbon fiber used in the description of the present invention are as described below.

(1) Deposition Amount of Sizing Agent

About 5 g of the carbon fiber on which a sizing agent is deposited was collected and placed in a heat-resistant vessel. Then, the vessel was dried at 120° C. for 3 hours and cooled to room temperature taking care not to cause moisture absorption; then the carbon fiber was weighed, and the weight was taken as $W_1$ (g). Next, the vessel with the carbon fiber therein was heated in a nitrogen atmosphere at 450° C. for 15 minutes and then cooled to room temperature taking care not to cause moisture absorption; the carbon fiber was weighed, and the weight was taken as $W_2$ (g). Through the procedure above, the deposition amount of the sizing agent on the carbon fiber was determined by the following equation.

$$\text{Deposition amount (\% by weight)} = 100 \times \{(W_1 - W_2)/W_2\}$$

(2) Convergence Property Evaluation

A carbon fiber bundle was cut, and about 70 g [weighed value: M (g)] of a chopped fiber was collected for introduction into a 500-mL graduated cylinder. Next, the graduated cylinder was subjected to a tapping treatment from a height of 2.54 cm on a rubber sheet with a thickness of 4 mm for 60 times, and then the volume of the chopped fiber in the graduated cylinder, V (mL), was read out. Through this procedure, the bulk density D was determined by the following equation.

$$D = M/V$$

The number of measurement was three times, and the average bulk density obtained by dividing a bulk density by the number of measurement was evaluated on a 4-point scale from A to D. A to C are acceptable, and D is unacceptable.

A: Average bulk density of 0.35 or more
B: Average bulk density of not less than 0.25 and less than 0.35
C: Average bulk density of not less than 0.2 and less than 0.25
D: Average bulk density of less than 0.2

(3) Dispersibility Evaluation (i) Dispersibility Evaluation (Normal)

A chopped fiber cut to 6 mm length in an amount of 0.05 g is placed into 300 mL of water, and the resultant is slowly stirred for 20 seconds and then allowed stand for 20 seconds. The dispersed state of the carbon fiber was visually observed, and the dispersibility was evaluated on a 4-point scale from A to D. A to B are acceptable, and C to D are unacceptable.

A: The number of fiber bundles that are not opened is less than 2
B: The number of fiber bundles that are not opened is not less than 2 and less than 5
C: The number of fiber bundles that are not opened is not less than 5 and less than 10
D: The number of fiber bundles that are not opened is 10 or more (ii) Dispersibility Evaluation (High Concentration)

A chopped fiber cut to 6 mm length in an amount of 2 g is placed into a vessel with a diameter of 150 mm containing 1,000 mL of water, and the resultant is slowly stirred for 60 seconds and then allowed stand for 60 seconds. The water was filtered off, and three small pieces of 2 cm×2 cm were cut out from the sheet-like carbon fiber obtained to measure the number of fiber bundles that are not opened by microscope observation. The observation was carried out on both of the front side and the back side of the small pieces, and the dispersibility was evaluated from the total number of fiber bundles that are not opened on a 4-point scale from A to D. A to C are acceptable, and D is unacceptable.

A: The number of fiber bundles that are not opened is less than 5
B: The number of fiber bundles that are not opened is not less than 5 and less than 9
C: The number of fiber bundles that are not opened is not less than 10 and less than 19
D: The number of fiber bundles that are not opened is 20 or more (4) Heat-resistance Evaluation (Thermal Weight Loss)

For 30 mg of a pure sizing agent, isothermal thermogravimetry was performed under an air atmosphere at 230° C. using a differential thermal analyzer (TG-DTA) to measure the TG (%) after 15 minutes. The heat resistance was evaluated from the rate of weight loss on a 4-point scale from A to D. Deficient heat resistance is undesirable not only because of reduced workability and reduced convergence property of the carbon fiber bundle associated with the occurrence of thermal decomposition products but also in terms of safety and environment.

A: Thermal weight loss is not more than 10%
B: Thermal weight loss is more than 10% and not more than 20%
C: Thermal weight loss is more than 20% and not more than 30%
D: Thermal weight loss is more than 30%

(5) Measurement of Drape Value

Under an atmosphere of 23±5° C., a carbon fiber bundle cut to 30 cm was fixed to the edge of a rectangular parallelepiped base. The fixation was carried out in such a manner that the carbon fiber bundle protruded from the edge of the base by 25 cm. In other words, the point 5 cm from the end of the carbon fiber bundle was set at the edge of the base, as shown in FIG. 1. After allowing the carbon fiber bundle to stand in this condition for 30 minutes, the shortest distance between the carbon fiber end that was not fixed to the base and the side of the base was measured to determine the drape value. For the number of measurements, n=5, and the mean value was employed.

(5) Measurement of Eluted Amount of Sizing Agent

A sizing agent was diluted with water to prepare 4% by weight of an aqueous solution or a water dispersion. A filter paper (No. 2 filter paper, diameter: 90 mm, available from ADVANEC) was immersed in this for 1 minute and then dried under reduced pressure at 60° C. for 2 hours to deposit the sizing agent to the filter paper. The deposition amount of the sizing agent was calculated from the weights of the filter paper before and after sizing agent deposition. Next, the filter paper was immersed in 250 mL of water to elute out the sizing agent. The dry weights of the filter paper after 1 minute and after 5 minutes were measured, and the eluted amount of the sizing agent from the filter paper (% by weight) was calculated.

Reference Example 1

Preparation of Aqueous Sizing Agent Solution (a-1)

Ethylene glycol (2 mol) and terephthalic acid (1 mol) were heated at 180° C. with stirring for dehydration reaction until the acid value was 1 or less to obtain bis(2-hydroxyethyl) terephthalate (BHET).

Polyethylene glycol (PEG) (weight-average molecular weight: 6,200) in an amount of 96.2 parts by weight and 0.99 parts by weight of BHET were heated to 120° C., and 2.86 parts by weight of tolylene diisocyanate (TDI) was added thereto. The resulting mixture was stirred to obtain an alkylene glycol/aromatic ester/aromatic urethane polyadduct.

The polyadduct obtained was diluted with water to a concentration of 10% to obtain an aqueous sizing agent solution (a-1).

Reference Example 2

Preparation of Aqueous Sizing Agent Solution (a-2)

An aqueous sizing agent solution (a-2) was obtained in the same manner as in Reference Example 1 except using 93.7 parts by weight of PEG (weight-average molecular weight: 6,200), 2.56 parts by weight of BHET, and 3.72 parts by weight of TDI.

Reference Example 3

Preparation of Aqueous Sizing Agent Solution (a-3)

An aqueous sizing agent solution (a-3) was obtained in the same manner as in Reference Example 1 except using 89.2 parts by weight of PEG (weight-average molecular weight: 6,200), 5.49 parts by weight of BHET, and 5.31 parts by weight of TDI.

Reference Example 4

Preparation of Aqueous Sizing Agent Solution (a-4)

An aqueous sizing agent solution (a-4) was obtained in the same manner as in Reference Example 1 except using 85.1 parts by weight of PEG (weight-average molecular weight: 6,200), 8.14 parts by weight of BHET, and 6.76 parts by weight of TDI.

Reference Example 5

Preparation of Aqueous Sizing Agent Solution (a-5)

An aqueous sizing agent solution (a-5) was obtained in the same manner as in Reference Example 1 except using 96.6 parts by weight of PEG (weight-average molecular weight: 7,000), 0.88 parts by weight of BHET, and 2.55 parts by weight of TDI.

Reference Example 6

Preparation of Aqueous Sizing Agent Solution (a-6)

An aqueous sizing agent solution (a-6) was obtained in the same manner as in Reference Example 1 except using 90.3 parts by weight of PEG (weight-average molecular weight: 7,000), 4.92 parts by weight of BHET, and 4.76 parts by weight of TDI.

Reference Example 7

Preparation of Aqueous Sizing Agent Solution (a-7)

An aqueous sizing agent solution (a-7) was obtained in the same manner as in Reference Example 1 except using 80.0 parts by weight of PEG (weight-average molecular weight: 7,000), 11.62 parts by weight of BHET, and 8.43 parts by weight of TDI.

Reference Example 8

Preparation of Aqueous Sizing Agent Solution (a-8)

An aqueous sizing agent solution (a-8) was obtained in the same manner as in Reference Example 1 except using 97.6 parts by weight of PEG (weight-average molecular weight: 10,000), 0.62 parts by weight of BHET, and 1.80 parts by weight of TDI.

Reference Example 9

Preparation of Aqueous Sizing Agent Solution (a-9)

An aqueous sizing agent solution (a-9) was obtained in the same manner as in Reference Example 1 except using 93.0 parts by weight of PEG (weight-average molecular weight: 10,000), 3.55 parts by weight of BHET, and 3.43 parts by weight of TDI.

Reference Example 10

Preparation of Aqueous Sizing Agent Solution (a-10)

An aqueous sizing agent solution (a-10) was obtained in the same manner as in Reference Example 1 except using 90.2 parts by weight of PEG (weight-average molecular weight: 10,000), 5.35 parts by weight of BHET, and 4.44 parts by weight of TDI.

Reference Example 11

Preparation of Aqueous Sizing Agent Solution (a-11)

An aqueous sizing agent solution (a-11) was obtained in the same manner as in Reference Example 1 except using 85.1 parts by weight of PEG (weight-average molecular weight: 10,000), 8.65 parts by weight of BHET, and 6.28 parts by weight of TDI.

Reference Example 12

Preparation of Aqueous Sizing Agent Solution (a-12)

An aqueous sizing agent solution (a-12) was obtained in the same manner as in Reference Example 1 except using 96.4 parts by weight of PEG (weight-average molecular weight: 20,000), 1.84 parts by weight of BHET, and 1.78 parts by weight of TDI.

Reference Example 13

Preparation of Aqueous Sizing Agent Solution (a-13)

An aqueous sizing agent solution (a-13) was obtained in the same manner as in Reference Example 1 except using 91.9 parts by weight of PEG (weight-average molecular weight: 20,000), 4.67 parts by weight of BHET, and 3.39 parts by weight of TDI.

Reference Example 14

Preparation of Aqueous Sizing Agent Solution (a-14)

An aqueous sizing agent solution (a-14) was obtained by polyaddition under the same conditions as in Reference Example 1 except that 97.7 parts by weight of PEG (weight-average molecular weight: 6,200) and 2.33 parts by weight of TDI were used and that BHET was not used.

Reference Example 15

Preparation of Aqueous Sizing Agent Solution (a-15)

An aqueous sizing agent solution (a-15) was obtained in the same manner as in Reference Example 1 except using 98.1 parts by weight of PEG (weight-average molecular weight: 10,000), 0.28 parts by weight of BHET, and 1.61 parts by weight of TDI.

Reference Example 16

Preparation of Aqueous Sizing Agent Solution (a-16)

An aqueous sizing agent solution (a-16) was obtained in the same manner as in Reference Example 1 except using 98.8 parts by weight of PEG (weight-average molecular weight: 20,000), 0.31 parts by weight of BHET, and 0.91 parts by weight of TDI.

Reference Example 17

Preparation of Aqueous Sizing Agent Solution (a-17)

An aqueous sizing agent solution (a-17) was obtained in the same manner as in Reference Example 1 except using 69.5 parts by weight of PEG (weight-average molecular weight: 4,000), 17.67 parts by weight of BHET, and 12.83 parts by weight of TDI.

Reference Example 18

Preparation of Aqueous Sizing Agent Solution (a-18)

According to Reference Example 1 in Patent Document 1 (WO 2006/019139), a surface active agent (A) obtained by mixing 80 parts by weight of polyoxyethylene oleyl ether represented by the chemical formula (I) below having a number average molecular weight of 600 and an HLB of 11.3 and 20 parts by weight of polyoxyethylene alkyl ether represented by the chemical formula (II) below having a number average molecular weight of 1300 and an HLB of 17 was prepared into an aqueous solution of 20% by weight concentration to obtain an aqueous sizing agent solution (a-18).

$C_{18}H_{35}O-(CH_2CH_2O)_8-H$ (I)

$C_{12}H_{25}O-(CH_2CH_2O)_{25}-H$ (II)

Reference Example 19

Preparation of Aqueous Sizing Agent Solution (a-19)

An aqueous sizing agent solution (a-19) was obtained in the same manner as in Reference Example 1 except using 89.0 parts by weight of PEG (weight-average molecular weight: 2,000), 2.8 parts by weight of BHET, and 8.2 parts by weight of TDI.

Reference Example 20

Preparation of Aqueous Sizing Agent Solution (a-20)

An aqueous sizing agent solution (a-20) was obtained in the same manner as in Reference Example 1 except using 94.2 parts by weight of PEG (weight-average molecular weight: 4,000), 1.5 parts by weight of BHET, and 4.3 parts by weight of TDI.

Reference Example 21

Preparation of Aqueous Sizing Agent Solution (a-21)

An aqueous sizing agent solution (a-21) was obtained in the same manner as in Reference Example 1 except using 90.6 parts by weight of PEG (weight-average molecular weight: 4,000), 3.8 parts by weight of BHET, and 5.6 parts by weight of TDI.

Reference Example 22

Preparation of Aqueous Sizing Agent Solution (a-22)

An aqueous sizing agent solution (a-22) was obtained in the same manner as in Reference Example 1 except using 93.6 parts by weight of PEG (weight-average molecular weight: 25,750), 3.7 parts by weight of BHET, and 2.7 parts by weight of TDI.

Reference Example 23

Preparation of Aqueous Sizing Agent Solution (a-23)

An aqueous sizing agent solution (a-23) was obtained in the same manner as in Reference Example 1 except using 87.2 parts by weight of PEG (weight-average molecular weight: 25,750), 7.8 parts by weight of BHET, and 5.0 parts by weight of TDI.

Reference Example 24

Preparation of Aqueous Sizing Agent Solution (a-24)

An aqueous sizing agent solution (a-24) was obtained in the same manner as in Reference Example 1 except using 94.7 parts by weight of PEG (weight-average molecular weight: 31,500), 3.1 parts by weight of BHET, and 2.2 parts by weight of TDI.

Reference Example 25

Preparation of Aqueous Sizing Agent Solution (a-25))

An aqueous sizing agent solution (a-25) was obtained in the same manner as in Reference Example 1 except using 89.3 parts by weight of PEG (weight-average molecular weight: 31,500), 6.5 parts by weight of BHET, and 4.2 parts by weight of TDI.

Reference Example 26

Preparation of Aqueous Sizing Agent Solution (a-26))

An aqueous sizing agent solution (a-26) was obtained in the same manner as in Reference Example 1 except using 96.2 parts by weight of polypropylene glycol (PPG) (weight-average molecular weight: 6,200) in place of PEG and using 0.99 parts by weight of BHET and 2.86 parts by weight of TDI.

Reference Example 27

Preparation of Aqueous Sizing Agent Solution (a-27)

An aqueous sizing agent solution (a-27) was obtained in the same manner as in Reference Example 1 except using 6.62 parts by weight of methylenediphenylene diisocyanate (MDI) in place of TDI and using 88.2 parts by weight of PEG (weight-average molecular weight: 10,000) and 5.23 parts by weight of BHET.

Reference Example 28

Preparation of Aqueous Sizing Agent Solution (a-28)

Ethylene glycol (2 mol) and isophthalic acid (1 mol) were heated at 180° C. with stirring for dehydration reaction until the acid value was 1 or less to obtain bis(2-hydroxyethyl) isophthalate (m-BHET).

Polyethylene glycol (PEG) (weight-average molecular weight: 10,000) in an amount of 90.2 parts by weight and 5.35 parts by weight of m-BHET were heated to 120° C., and 4.44 parts by weight of tolylene diisocyanate (TDI) was added thereto. The resulting mixture was stirred to obtain an alkylene glycol/aromatic ester/aromatic urethane polyadduct.

The polyadduct obtained was diluted with water to a concentration of 10% to obtain an aqueous sizing agent solution (a-28).

Reference Example 29

Preparation of Aqueous Sizing Agent Solution (a-29)

Ethylene glycol (2 mol) and terephthalic acid (1 mol) were heated at 180° C. with stirring for dehydration reaction until the acid value was 1 or less to obtain bis(2-hydroxyethyl) terephthalate (BHET).

Polyethylene glycol (PEG) (weight-average molecular weight: 6,200) in an amount of 95.2 parts by weight and 0.98 parts by weight of BHET were heated to 120° C., and 3.84 parts by weight of isophorone diisocyanate (IPDI) was added thereto. The resulting mixture was stirred to obtain an alkylene glycol/aromatic ester/aliphatic urethane polyadduct.

The polyadduct obtained was diluted with water to a concentration of 10% to obtain an aqueous sizing agent solution (a-29).

Reference Example 30

Preparation of Aqueous Sizing Agent Solution (a-30)

An aqueous sizing agent solution (a-30) was obtained in the same manner as in Reference Example 29 except using 92.5 parts by weight of PEG (weight-average molecular weight: 6,200), 2.53 parts by weight of BHET, and 4.97 parts by weight of IPDI.

Reference Example 31

Preparation of Aqueous Sizing Agent Solution (a-31)

An aqueous sizing agent solution (a-31) was obtained in the same manner as in Reference Example 29 except using 87.6 parts by weight of PEG (weight-average molecular weight: 6,200), 5.39 parts by weight of BHET, and 7.06 parts by weight of IPDI.

Reference Example 32

Preparation of Aqueous Sizing Agent Solution (a-32)

An aqueous sizing agent solution (a-32) was obtained in the same manner as in Reference Example 29 except using 83.1 parts by weight of PEG (weight-average molecular weight: 6,200), 7.95 parts by weight of BHET, and 8.94 parts by weight of IPDI.

Reference Example 33

Preparation of Aqueous Sizing Agent Solution (a-33)

An aqueous sizing agent solution (a-33) was obtained in the same manner as in Reference Example 29 except using 95.7 parts by weight of PEG (weight-average molecular weight: 7,000), 0.87 parts by weight of BHET, and 3.42 parts by weight of IPDI.

Reference Example 34

Preparation of Aqueous Sizing Agent Solution (a-34)

An aqueous sizing agent solution (a-34) was obtained in the same manner as in Reference Example 29 except using 88.8 parts by weight of PEG (weight-average molecular weight: 7,000), 4.84 parts by weight of BHET, and 6.35 parts by weight of IPDI.

Reference Example 35

Preparation of Aqueous Sizing Agent Solution (a-35)

An aqueous sizing agent solution (a-35) was obtained in the same manner as in Reference Example 29 except using 97.0 parts by weight of PEG (weight-average molecular weight: 10,000), 0.62 parts by weight of BHET, and 2.42 parts by weight of IPDI.

Reference Example 36

Preparation of Aqueous Sizing Agent Solution (a-36)

An aqueous sizing agent solution (a-36) was obtained in the same manner as in Reference Example 29 except using 91.9 parts by weight of PEG (weight-average molecular weight: 10,000), 3.50 parts by weight of BHET, and 4.60 parts by weight of IPDI.

Reference Example 37

Preparation of Aqueous Sizing Agent Solution (a-37)

An aqueous sizing agent solution (a-37) was obtained in the same manner as in Reference Example 29 except using 88.8 parts by weight of PEG (weight-average molecular weight: 10,000), 5.27 parts by weight of BHET, and 5.92 parts by weight of IPDI.

Reference Example 38

Preparation of Aqueous Sizing Agent Solution (a-38)

An aqueous sizing agent solution (a-38) was obtained in the same manner as in Reference Example 29 except using 83.2 parts by weight of PEG (weight-average molecular weight: 10,000), 8.46 parts by weight of BHET, and 8.32 parts by weight of IPDI.

Reference Example 39

Preparation of Aqueous Sizing Agent Solution (a-39)

An aqueous sizing agent solution (a-39) was obtained in the same manner as in Reference Example 29 except using 95.8 parts by weight of PEG (weight-average molecular weight: 20,000), 1.83 parts by weight of BHET, and 2.40 parts by weight of IPDI.

Reference Example 40

Preparation of Aqueous Sizing Agent Solution (a-40)

An aqueous sizing agent solution (a-40) was obtained in the same manner as in Reference Example 29 except using 90.8 parts by weight of PEG (weight-average molecular weight: 20,000), 4.62 parts by weight of BHET, and 4.54 parts by weight of IPDI.

Reference Example 41

Preparation of Aqueous Sizing Agent Solution (a-41)

An aqueous sizing agent solution (a-41) was obtained in the same manner as in Reference Example 29 except using 86.4 parts by weight of PEG (weight-average molecular weight: 2,000), 2.75 parts by weight of BHET, and 10.81 parts by weight of IPDI.

Reference Example 42

Preparation of Aqueous Sizing Agent Solution (a-42))

An aqueous sizing agent solution (a-42) was obtained in the same manner as in Reference Example 29 except using 92.7 parts by weight of PEG (weight-average molecular weight: 4,000) and 1.47 parts by weight of BHET and using 5.80 parts by weight of IPDI.

Reference Example 43

Preparation of Aqueous Sizing Agent Solution (a-43)

An aqueous sizing agent solution (a-43) was obtained in the same manner as in Reference Example 29 except using 88.8 parts by weight of PEG (weight-average molecular weight: 4,000), 3.76 parts by weight of BHET, and 7.40 parts by weight of IPDI.

Reference Example 44

Preparation of Aqueous Sizing Agent Solution (a-44)

An aqueous sizing agent solution (a-44) was obtained in the same manner as in Reference Example 29 except using 92.7 parts by weight of PEG (weight-average molecular weight: 25,750), 3.66 parts by weight of BHET, and 3.60 parts by weight of IPDI.

Reference Example 45

Preparation of Aqueous Sizing Agent Solution (a-45)

An aqueous sizing agent solution (a-45) was obtained in the same manner as in Reference Example 29 except using 85.7 parts by weight of PEG (weight-average molecular weight: 25,750), 7.62 parts by weight of BHET, and 6.66 parts by weight of IPDI.

Reference Example 46

Preparation of Aqueous Sizing Agent Solution (a-46)

An aqueous sizing agent solution (a-46) was obtained in the same manner as in Reference Example 29 except using 94.0 parts by weight of PEG (weight-average molecular weight: 31,500), 3.03 parts by weight of BHET, and 2.98 parts by weight of IPDI.

Reference Example 47

Preparation of Aqueous Sizing Agent Solution (a-47)

An aqueous sizing agent solution (a-47) was obtained in the same manner as in Reference Example 29 except using 88.0 parts by weight of PEG (weight-average molecular weight: 31,500), 6.39 parts by weight of BHET, and 5.59 parts by weight of IPDI.

Reference Example 48

Preparation of Aqueous Sizing Agent Solution (a-48)

An aqueous sizing agent solution (a-48) was obtained in the same manner as in Reference Example 29 except using 3.81 parts by weight of hexamethylene diisocyanate (HDI) in place of IPDI and using 93.6 parts by weight of PEG (weight-average molecular weight: 6,200) and 2.56 parts by weight of BHET.

Reference Example 49

Preparation of Aqueous Sizing Agent Solution (a-49)

An aqueous sizing agent solution (a-49) was obtained in the same manner as in Reference Example 48 except using 90.2 parts by weight of PEG (weight-average molecular weight: 7,000), 4.91 parts by weight of BHET, and 4.87 parts by weight of HDI.

Reference Example 50

Preparation of Aqueous Sizing Agent Solution (a-50)

An aqueous sizing agent solution (a-50) was obtained in the same manner as in Reference Example 48 except using 90.1 parts by weight of PEG (weight-average molecular weight: 10,000), 5.35 parts by weight of BHET, and 4.54 parts by weight of HDI.

Reference Example 51

Preparation of Aqueous Sizing Agent Solution (a-51)

An aqueous sizing agent solution (a-51) was obtained in the same manner as in Reference Example 29 except using 88.8 parts by weight of polypropylene glycol (PPG) (weight-average molecular weight: 10,000) in place of PEG and using 5.27 parts by weight of BHET and 5.92 parts by weight of IPDI.

Reference Example 52

Preparation of Aqueous Sizing Agent Solution (a-52)

Ethylene glycol (2 mol) and isophthalic acid (1 mol) were heated at 180° C. with stirring for dehydration reaction until the acid value was 1 or less to obtain bis(2-hydroxyethyl) isophthalate (mBHET).

Polyethylene glycol (PEG) (weight-average molecular weight: 10,000) in an amount of 88.8 parts by weight and 5.27 parts by weight of mBHET were heated to 120° C., and 5.92 parts by weight of isophorone diisocyanate (IPDI) was added thereto. The resulting mixture was stirred to obtain an alkylene glycol/aromatic ester/aliphatic urethane polyadduct.

The polyadduct obtained was diluted with water to a concentration of 10% to obtain an aqueous sizing agent solution (a-52).

Reference Example 53

Preparation of Aqueous Sizing Agent Solution (a-53)

An aqueous sizing agent solution (a-53) was obtained by polyaddition under the same conditions as in Reference Example 29 except that 96.9 parts by weight of PEG (weight-average molecular weight: 6,200) and 3.13 parts by weight of IPDI were used and that BHET was not used.

Reference Example 54

Preparation of Aqueous Sizing Agent Solution (a-54)

An aqueous sizing agent solution (a-54) was obtained in the same manner as in Reference Example 29 except using 97.6 parts by weight of PEG (weight-average molecular weight: 10,000), 0.28 parts by weight of BHET, and 2.17 parts by weight of IPDI.

Reference Example 55

Preparation of Aqueous Sizing Agent Solution (a-55)

An aqueous sizing agent solution (a-55) was obtained in the same manner as in Reference Example 29 except using 98.5 parts by weight of PEG (weight-average molecular weight: 20,000), 0.31 parts by weight of BHET, and 1.23 parts by weight of IPDI.

Reference Example 56

Preparation of Aqueous Sizing Agent Solution (a-56)

An aqueous sizing agent solution (a-56) was obtained in the same manner as in Reference Example 29 except using 77.6 parts by weight of PEG (weight-average molecular weight: 7,000), 11.28 parts by weight of BHET, and 11.09 parts by weight of IPDI.

Reference Example 57

Preparation of Aqueous Sizing Agent Solution (a-57)

One mole of polyethylene glycol (PEG) (weight-average molecular weight: 2,000) (91.99 parts by weight) was heated to 120° C., and 1 mol of tolylene diisocyanate (TDI) (8.01 parts by weight) was added thereto. The resulting mixture was stirred to obtain a PEG-TDI polyadduct. The polyadduct obtained was diluted with water to a concentration of 10% by mass to obtain an aqueous sizing agent solution (a-57).

Reference Example 58

Preparation of Aqueous Sizing Agent Solution (a-58)

An aqueous sizing agent solution (a-58) was obtained in the same manner as in Reference Example 57 except using PEG having a weight-average molecular weight of 4,000. The material ratio in obtaining the PEG-TDI polyadduct was 1 mol of PEG (95.83 parts by weight) to 1 mol of TDI (4.17 parts by weight).

Reference Example 59

Preparation of Aqueous Sizing Agent Solution (a-59)

An aqueous sizing agent solution (a-59) was obtained in the same manner as in Reference Example 57 except using PEG having a weight-average molecular weight of 6,200. The material ratio in obtaining the PEG-TDI polyadduct was 1 mol of PEG (97.27 parts by weight) to 1 mol of TDI (2.73 parts by weight).

Reference Example 60

Preparation of Aqueous Sizing Agent Solution (a-60)

An aqueous sizing agent solution (a-60) was obtained in the same manner as in Reference Example 57 except using PEG having a weight-average molecular weight of 7,000. The material ratio in obtaining the PEG-TDI polyadduct was 1 mol of PEG (97.57 parts by weight) to 1 mol of TDI (2.43 parts by weight).

Reference Example 61

Preparation of Aqueous Sizing Agent Solution (a-61)

An aqueous sizing agent solution (a-61) was obtained in the same manner as in Reference Example 57 except using PEG having a weight-average molecular weight of 10,000. The material ratio in obtaining the PEG-TDI polyadduct was 1 mol of PEG (98.29 parts by weight) to 1 mol of TDI (1.71 parts by weight).

Reference Example 62

Preparation of Aqueous Sizing Agent Solution (a-62)

An aqueous sizing agent solution (a-62) was obtained in the same manner as in Reference Example 57 except using PEG having a weight-average molecular weight of 20,000. The material ratio in obtaining the PEG-TDI polyadduct was 1 mol of PEG (99.14 parts by weight) to 1 mol of TDI (0.86 parts by weight).

Reference Example 63

Preparation of Aqueous Sizing Agent Solution (a-63)

An aqueous sizing agent solution (a-63) was obtained in the same manner as in Reference Example 57 except using PEG having a weight-average molecular weight of 25,750. The material ratio in obtaining the PEG-TDI polyadduct was 1 mol of PEG (99.33 parts by weight) to 1 mol of TDI (0.67 parts by weight).

Reference Example 64

Preparation of Aqueous Sizing Agent Solution (a-64)

An aqueous sizing agent solution (a-64) was obtained in the same manner as in Reference Example 57 except using PEG having a weight-average molecular weight of 31,500.

The material ratio in obtaining the PEG-TDI polyadduct was 1 mol of PEG (99.45 parts by weight) to 1 mol of TDI (0.55 parts by weight).

Reference Example 65

Preparation of Aqueous Sizing Agent Solution (a-65)

One mole of PEG having a weight-average molecular weight of 10,000 (97.56 parts by weight) and 1 mol of methylenediphenylene diisocyanate (MDI) (2.44 parts by weight) were allowed to undergo polyaddition in the same manner as in Reference Example 57, and the resultant was diluted with water to 10% by mass to obtain an aqueous sizing agent solution (a-65).

Reference Example 66

Preparation of Aqueous Sizing Agent Solution (a-66)

One mole of PEG having a weight-average molecular weight of 10,000 (98.35 parts by weight) and 1 mol of hexamethylene diisocyanate (HDI) (1.65 parts by weight) were allowed to undergo polyaddition in the same manner as in Reference Example 57 and the resultant was diluted with water to 10% by mass to obtain an aqueous sizing agent solution (a-66).

Reference Example 67

Preparation of Aqueous Sizing Agent Solution (a-67)

An aqueous sizing agent solution (a-67) was obtained in the same manner as in Reference Example 57 except that 1 mol of polypropylene glycol (PPG) having a weight-average molecular weight of 10,000 (98.29 parts by weight) was used in place of PEG having a weight-average molecular weight of 2,000 and that TDI in an amount of 1 mol (1.71 parts by weight) was used to obtain a PEG-TDI polyadduct.

Reference Example 68

Preparation of Aqueous Sizing Agent Solution (a-68)

Ethylene glycol (1.2 mol) and terephthalic acid (0.6 mol) were heated at 180° C. with stirring for dehydration reaction until the acid value was 1 or less to obtain bis(2-hydroxyethyl)terephthalate (BHET).
A mixture of 0.4 mol of PEG having a weight-average molecular weight of 10,000 (92.45 parts by weight) and 0.6 mol of BHET (3.53 parts by weight) was heated to 120° C., and 1 mol of TDI (4.03 parts by weight) was added thereto. The resulting mixture was stirred to obtain a PEG/BHET-TDI polyadduct. The polyadduct obtained was diluted with water to a concentration of 10% by mass to obtain an aqueous sizing agent solution (a-68).

Reference Example 69

Preparation of Aqueous Sizing Agent Solution (a-69)

An aqueous sizing agent solution (a-69) was obtained in the same manner as in Reference Example 68 except using PEG having a weight-average molecular weight of 7,000. The material ratio in obtaining a PEG/BHET-TDI polyadduct was 0.4 mol of PEG (89.55 parts by weight) to 0.6 mol of BHET (4.88 parts by weight) to 1 mol of TDI (5.57 parts by weight).

Reference Example 70

Preparation of Aqueous Sizing Agent Solution (a-70)

Ethylene glycol (1.2 mol) and adipic acid (0.6 mol) were heated at 180° C. with stirring for dehydration reaction until the acid value was 1 or less to obtain bis(2-hydroxyethyl)adipate (BHEA).
A mixture of 0.4 mol of PEG having a weight-average molecular weight of 10,000 (92.71 parts by weight) and 0.6 mol of BHEA (3.26 parts by weight) was heated to 120° C., and 1 mol of TDI (4.04 parts by weight) was added thereto. The resulting mixture was stirred to obtain a PEG/BHEA-TDI polyadduct. The polyadduct obtained was diluted with water to a concentration of 10% by mass to obtain an aqueous sizing agent solution (a-70).

Reference Example 71

Preparation of Aqueous Sizing Agent Solution (a-71)

Ethylene glycol (1.2 mol) and succinic acid (0.6 mol) were heated at 180° C. with stirring for dehydration reaction until the acid value was 1 or less to obtain bis(2-hydroxyethyl)succinate (BHES).
A mixture of 0.4 mol of PEG having a weight-average molecular weight of 10,000 (93.07 parts by weight) and 0.6 mol of BHES (2.88 parts by weight) was heated to 120° C., and 1 mol of TDI (4.05 parts by weight) was added thereto. The resulting mixture was stirred to obtain a PEG/BHES-TDI polyadduct. The polyadduct obtained was diluted with water to a concentration of 10% by mass to obtain an aqueous sizing agent solution (a-71).

Reference Example 72

Preparation of Aqueous Sizing Agent Solution (a-72)

An aqueous sizing agent solution (a-72) was obtained in the same manner as in Reference Example 68 except using 1 mol of isophorone diisocyanate (IPDI) as diisocyanate. The material ratio in obtaining a PEG/BHET-IPDI polyadduct was 0.4 mol of PEG (91.43 parts by weight) to 0.6 mol of BHET (3.49 parts by weight) to 1 mol IPDI (5.08 parts by weight).

Reference Example 73

Preparation of Aqueous Sizing Agent Solution (a-73)

An aqueous sizing agent solution (a-73) was obtained in the same manner as in Reference Example 57 except using 1 mol of isophorone diisocyanate (IPDI) as diisocyanate. The material ratio in obtaining a PEG-IPDI polyadduct was 1 mol of PEG (97.83 parts by weight) to 1 mol of IPDI (2.17 parts by weight).

Reference Example 74

Preparation of Aqueous Sizing Agent Solution (a-74)

An aqueous sizing agent solution (a-74) was obtained in the same manner as in Reference Example 71 except that 0.1 mol of PEG having a weight-average molecular weight of 10,000 (71.28 parts by weight) and 0.9 mol of BHET (16.31 parts by weight) was used to obtain BHET and that 1 mol of TDI (12.41 parts by weight) was used to obtain a PEG/BHET-TDI polyadduct.

Example 1

In an aqueous solution obtained by adjusting the aqueous sizing agent solution of Reference Example 1 (a-1) to have a concentration of 3.5%, a carbon fiber continuous bundle (T700S-12K available from TORAY INDUSTRIES, INC.) was immersed for deposition of the sizing agent and dried with a hot-air dryer at 210° C. for 1 minute. The carbon fiber bundle obtained on which the sizing agent had been deposited was cut to 6 mm length to obtain a chopped fiber. The carbon fiber bundle obtained had no problem with windability around a bobbin, fluffs, or the like and had good handleability. The property evaluations of the carbon fiber bundle obtained are collectively shown in Table 2.

Example 2

A chopped fiber was obtained in the same manner as in Example 1 except using the sizing agent of Reference Example 2 (a-2) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 3

A chopped fiber was obtained in the same manner as in Example 1 except using the sizing agent of Reference Example 3 (a-3) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 4

A chopped fiber was obtained in the same manner as in Example 1 except using the sizing agent of Reference Example 4 (a-4) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 5

A chopped fiber was obtained in the same manner as in Example 1 except using the sizing agent of Reference Example 5 (a-5) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 6

A chopped fiber was obtained in the same manner as in Example 1 except using the sizing agent of Reference Example 6 (a-6) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 7

A chopped fiber was obtained in the same manner as in Example 1 except using the sizing agent of Reference Example 7 (a-7) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 8

A chopped fiber was obtained in the same manner as in Example 1 except using the sizing agent of Reference Example 8 (a-8) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 9

A chopped fiber was obtained in the same manner as in Example 1 except using the sizing agent of Reference Example 9 (a-9) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 10

A chopped fiber was obtained in the same manner as in Example 1 except using the sizing agent of Reference Example 10 (a-10) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 11

A chopped fiber was obtained in the same manner as in Example 1 except using the sizing agent of Reference Example 11 (a-11) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 12

A chopped fiber was obtained in the same manner as in Example 1 except using the sizing agent of Reference Example 12 (a-12) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 13

A chopped fiber was obtained in the same manner as in Example 1 except using the sizing agent of Reference Example 13 (a-13) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 14

A chopped fiber was obtained in the same manner as in Example 1 except that the aqueous sizing agent solution of Reference Example 10 (a-10) was adjusted to have a concentration of 2.0%. The deposition amount of the sizing agent was 1.5% by mass. The carbon fiber bundle obtained had no problem with windability around a bobbin, fluffs, or the like and had good handleability. The property evaluations of the carbon fiber bundle obtained are collectively shown in Table 2.

Example 15

A chopped fiber was obtained in the same manner as in Example 1 except that the aqueous sizing agent solution of Reference Example 10 (a-10) was adjusted to have a concentration of 1.2%. The deposition amount of the sizing agent was 0.8% by mass. The carbon fiber bundle obtained had no problem with windability around a bobbin, fluffs, or the like and had good handleability. The property evaluations of the carbon fiber bundle obtained are collectively shown in Table 2.

Example 16

A chopped fiber was obtained in the same manner as in Example 1 except using the sizing agent of Reference Example 19 (a-19) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 17

A chopped fiber was obtained in the same manner as in Example 1 except using the sizing agent of Reference Example 20 (a-20) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 18

A chopped fiber was obtained in the same manner as in Example 1 except using the sizing agent of Reference Example 21 (a-21) as an aqueous sizing agent solution. The carbon fiber bundle obtained had no problem with windability around a bobbin, fluffs, or the like and had good handleability. The property evaluations of the carbon fiber bundle obtained are collectively shown in Table 2.

Example 19

A chopped fiber was obtained in the same manner as in Example 1 except using the sizing agent of Reference Example 22 (a-22) as an aqueous sizing agent solution. The carbon fiber bundle obtained was slightly stiff but could be wound around a bobbin. There was no problem with fluffs. The property evaluations of the carbon fiber bundle obtained are collectively shown in Table 2.

Example 20

A chopped fiber was obtained in the same manner as in Example 1 except using the sizing agent of Reference Example 23 (a-23) as an aqueous sizing agent solution. The carbon fiber bundle obtained was slightly stiff but could be wound around a bobbin. There was no problem with fluffs. The property evaluations of the carbon fiber bundle obtained are collectively shown in Table 2.

Example 21

A chopped fiber was obtained in the same manner as in Example 1 except using the sizing agent of Reference Example 24 (a-24) as an aqueous sizing agent solution. The carbon fiber bundle obtained was slightly stiff but could be wound around a bobbin. There was no problem with fluffs. The property evaluations of the carbon fiber bundle obtained are collectively shown in Table 2.

Example 22

A chopped fiber was obtained in the same manner as in Example 1 except using the sizing agent of Reference Example 25 (a-25) as an aqueous sizing agent solution. The carbon fiber bundle obtained was slightly stiff but could be wound around a bobbin. There was no problem with fluffs. The property evaluations of the carbon fiber bundle obtained are collectively shown in Table 2.

Example 23

A chopped fiber was obtained in the same manner as in Example 1 except using the sizing agent of Reference Example 26 (a-26) as an aqueous sizing agent solution. The carbon fiber bundle obtained was stiff but could be wound around a bobbin. There was no problem with fluffs. The property evaluations of the carbon fiber bundle obtained are collectively shown in Table 2.

Example 24

A chopped fiber was obtained in the same manner as in Example 1 except using the sizing agent of Reference Example 27 (a-27) as an aqueous sizing agent solution. The carbon fiber bundle obtained was stiff but could be wound around a bobbin. There was no problem with fluffs. The property evaluations of the carbon fiber bundle obtained are collectively shown in Table 2.

Example 25

A chopped fiber was obtained in the same manner as in Example 1 except using the sizing agent of Reference Example 28 (a-28) as an aqueous sizing agent solution. The carbon fiber bundle obtained had no problem with windability around a bobbin, fluffs, or the like and had good handleability. There was no problem with fluffs. The property evaluations of the carbon fiber bundle obtained are collectively shown in Table 2.

Example 26

In an aqueous solution obtained by adjusting the aqueous sizing agent solution of Reference Example 29 (a-29) to have a concentration of 3.5%, a carbon fiber continuous bundle (T700S-12K available from TORAY INDUSTRIES, INC.) was immersed for deposition of the sizing agent and dried with a hot-air dryer at 170° C. for 2 minutes. The carbon fiber bundle obtained on which the sizing agent had been deposited was cut to 6 mm length to obtain a chopped fiber. The property evaluations of the carbon fiber bundle obtained are collectively shown in Table 3.

Example 27

A chopped fiber was obtained in the same manner as in Example 26 except using the sizing agent of Reference Example 30 (a-30) as an aqueous sizing agent solution. The property evaluations of the carbon fiber bundle obtained are collectively shown in Table 3.

Example 28

A chopped fiber was obtained in the same manner as in Example 26 except using the sizing agent of Reference Example 31 (a-31) as an aqueous sizing agent solution. The property evaluations of the carbon fiber bundle obtained are collectively shown in Table 3.

Example 29

A chopped fiber was obtained in the same manner as in Example 26 except using the sizing agent of Reference Example 32 (a-32) as an aqueous sizing agent solution. The property evaluations of the carbon fiber bundle obtained are collectively shown in Table 3.

Example 30

A chopped fiber was obtained in the same manner as in Example 26 except using the sizing agent of Reference Example 33 (a-33) as an aqueous sizing agent solution. The property evaluations of the carbon fiber bundle obtained are collectively shown in Table 3.

Example 31

A chopped fiber was obtained in the same manner as in Example 26 except using the sizing agent of Reference Example 34 (a-34) as an aqueous sizing agent solution. The property evaluations of the carbon fiber bundle obtained are collectively shown in Table 3.

Example 32

A chopped fiber was obtained in the same manner as in Example 26 except using the sizing agent of Reference Example 35 (a-35) as an aqueous sizing agent solution. The property evaluations of the carbon fiber bundle obtained are collectively shown in Table 3.

Example 33

A chopped fiber was obtained in the same manner as in Example 26 except using the sizing agent of Reference Example 36 (a-36) as an aqueous sizing agent solution. The property evaluations of the carbon fiber bundle obtained are collectively shown in Table 3.

Example 34

A chopped fiber was obtained in the same manner as in Example 26 except using the sizing agent of Reference Example 37 (a-37) as an aqueous sizing agent solution. The property evaluations of the carbon fiber bundle obtained are collectively shown in Table 3.

Example 35

A chopped fiber was obtained in the same manner as in Example 26 except using the sizing agent of Reference Example 38 (a-38) as an aqueous sizing agent solution. The property evaluations of the carbon fiber bundle obtained are collectively shown in Table 3.

Example 36

A chopped fiber was obtained in the same manner as in Example 26 except using the sizing agent of Reference Example 39 (a-39) as an aqueous sizing agent solution. The property evaluations of the carbon fiber bundle obtained are collectively shown in Table 3.

Example 37

A chopped fiber was obtained in the same manner as in Example 26 except using the sizing agent of Reference Example 40 (a-40) as an aqueous sizing agent solution. The property evaluations of the carbon fiber bundle obtained are collectively shown in Table 3.

Example 38

A chopped fiber was obtained in the same manner as in Example 26 except using the sizing agent of Reference Example 41 (a-41) as an aqueous sizing agent solution. The property evaluations of the carbon fiber bundle obtained are collectively shown in Table 3.

Example 39

A chopped fiber was obtained in the same manner as in Example 26 except using the sizing agent of Reference Example 42 (a-42) as an aqueous sizing agent solution. The property evaluations of the carbon fiber bundle obtained are collectively shown in Table 3.

Example 40

A chopped fiber was obtained in the same manner as in Example 26 except using the sizing agent of Reference Example 43 (a-43) as an aqueous sizing agent solution. The property evaluations of the carbon fiber bundle obtained are collectively shown in Table 3.

Example 41

A chopped fiber was obtained in the same manner as in Example 26 except using the sizing agent of Reference Example 44 (a-44) as an aqueous sizing agent solution. The property evaluations of the carbon fiber bundle obtained are collectively shown in Table 3.

Example 42

A chopped fiber was obtained in the same manner as in Example 26 except using the sizing agent of Reference Example 45 (a-45) as an aqueous sizing agent solution. The property evaluations of the carbon fiber bundle obtained are collectively shown in Table 3.

Example 43

A chopped fiber was obtained in the same manner as in Example 26 except using the sizing agent of Reference Example 46 (a-46) as an aqueous sizing agent solution. The property evaluations of the carbon fiber bundle obtained are collectively shown in Table 3.

Example 44

A chopped fiber was obtained in the same manner as in Example 26 except using the sizing agent of Reference Example 47 (a-47) as an aqueous sizing agent solution. The property evaluations of the carbon fiber bundle obtained are collectively shown in Table 3.

Example 45

A chopped fiber was obtained in the same manner as in Example 26 except that the aqueous sizing agent solution of Reference Example 37 (a-37) was adjusted to have a concentration of 2.0%. The deposition amount of the sizing agent was 1.6% by mass. The property evaluations of the carbon fiber bundle obtained are collectively shown in Table 3.

Example 46

A chopped fiber was obtained in the same manner as in Example 26 except that the aqueous sizing agent solution of Reference Example 37 (a-37) was adjusted to have a concentration of 1.2%. The deposition amount of the sizing agent was 0.7% by mass. The property evaluations of the carbon fiber bundle obtained are collectively shown in Table 3.

Example 47

A chopped fiber was obtained in the same manner as in Example 26 except using the sizing agent of Reference Example 48 (a-48) as an aqueous sizing agent solution. The property evaluations of the carbon fiber bundle obtained are collectively shown in Table 3.

Example 48

A chopped fiber was obtained in the same manner as in Example 26 except using the sizing agent of Reference Example 49 (a-49) as an aqueous sizing agent solution. The property evaluations of the carbon fiber bundle obtained are collectively shown in Table 3.

Example 49

A chopped fiber was obtained in the same manner as in Example 26 except using the sizing agent of Reference Example 50 (a-50) as an aqueous sizing agent solution. The property evaluations of the carbon fiber bundle obtained are collectively shown in Table 3.

Example 50

A chopped fiber was obtained in the same manner as in Example 26 except using the sizing agent of Reference Example 51 (a-51) as an aqueous sizing agent solution. The property evaluations of the carbon fiber bundle obtained are collectively shown in Table 3.

Example 51

A chopped fiber was obtained in the same manner as in Example 26 except using the sizing agent of Reference Example 52 (a-52) as an aqueous sizing agent solution. The property evaluations of the carbon fiber bundle obtained are collectively shown in Table 3.

Example 52

In an aqueous solution obtained by adjusting the aqueous sizing agent solution of Reference Example 57 (a-57) to have a concentration of 3.5%, a carbon fiber continuous bundle (T700S-12K available from TORAY INDUSTRIES, INC.) was immersed for deposition of the sizing agent and dried with a hot-air dryer at 170° C. for 2 minutes. The carbon fiber bundle obtained on which the sizing agent had been deposited was cut to 6 mm length to obtain a chopped fiber. The property evaluations of the carbon fiber bundle obtained are collectively shown in Table 4.

Example 53

A chopped fiber was obtained in the same manner as in Example 52 except using the sizing agent of Reference Example 58 (a-58) as an aqueous sizing agent solution. The property evaluations of the carbon fiber bundle obtained are collectively shown in Table 4.

Example 54

A chopped fiber was obtained in the same manner as in Example 52 except using the sizing agent of Reference Example 59 (a-59) as an aqueous sizing agent solution. The property evaluations of the carbon fiber bundle obtained are collectively shown in Table 4.

Example 55

A chopped fiber was obtained in the same manner as in Example 52 except using the sizing agent of Reference Example 60 (a-60) as an aqueous sizing agent solution. The property evaluations of the carbon fiber bundle obtained are collectively shown in Table 4.

Example 56

A chopped fiber was obtained in the same manner as in Example 52 except using the sizing agent of Reference Example 61 (a-61) as an aqueous sizing agent solution. The property evaluations of the carbon fiber bundle obtained are collectively shown in Table 4.

Example 57

A chopped fiber was obtained in the same manner as in Example 52 except using the sizing agent of Reference Example 62 (a-62) as an aqueous sizing agent solution. The property evaluations of the carbon fiber bundle obtained are collectively shown in Table 4.

Example 58

A chopped fiber was obtained in the same manner as in Example 52 except using the sizing agent of Reference Example 63 (a-63) as an aqueous sizing agent solution. The property evaluations of the carbon fiber bundle obtained are collectively shown in Table 4.

Example 59

A chopped fiber was obtained in the same manner as in Example 52 except using the sizing agent of Reference

Example 64 (a-64) as an aqueous sizing agent solution. The property evaluations of the carbon fiber bundle obtained are collectively shown in Table 4.

Example 60

A chopped fiber was obtained in the same manner as in Example 52 except using the sizing agent of Reference Example 65 (a-65) as an aqueous sizing agent solution. The property evaluations of the carbon fiber bundle obtained are collectively shown in Table 4.

Example 61

A chopped fiber was obtained in the same manner as in Example 52 except using the sizing agent of Reference Example 66 (a-66) as an aqueous sizing agent solution. The property evaluations of the carbon fiber bundle obtained are collectively shown in Table 4.

Example 62

A chopped fiber was obtained in the same manner as in Example 52 except using the sizing agent of Reference Example 67 (a-67) as an aqueous sizing agent solution. The property evaluations of the carbon fiber bundle obtained are collectively shown in Table 4.

Example 63

A chopped fiber was obtained in the same manner as in Example 52 except using the sizing agent of Reference Example 68 (a-68) as an aqueous sizing agent solution. The property evaluations of the carbon fiber bundle obtained are collectively shown in Table 4.

Example 64

A chopped fiber was obtained in the same manner as in Example 52 except using the sizing agent of Reference Example 69 (a-69) as an aqueous sizing agent solution. The property evaluations of the carbon fiber bundle obtained are collectively shown in Table 4.

Example 65

A chopped fiber was obtained in the same manner as in Example 52 except using the sizing agent of Reference Example 70 (a-70) as an aqueous sizing agent solution. The property evaluations of the carbon fiber bundle obtained are collectively shown in Table 4.

Example 66

A chopped fiber was obtained in the same manner as in Example 52 except using the sizing agent of Reference Example 71 (a-71) as an aqueous sizing agent solution. The property evaluations of the carbon fiber bundle obtained are collectively shown in Table 4.

Example 67

A chopped fiber was obtained in the same manner as in Example 52 except using the sizing agent of Reference Example 72 (a-72) as an aqueous sizing agent solution. The property evaluations of the carbon fiber bundle obtained are collectively shown in Table 4.

Example 68

A chopped fiber was obtained in the same manner as in Example 52 except that the aqueous sizing agent solution of Reference Example 61 (a-61) was adjusted to have a concentration of 2.0%. The deposition amount of the sizing agent was 1.4% by mass. The property evaluations of the carbon fiber bundle obtained are collectively shown in Table 4.

Example 69

A chopped fiber was obtained in the same manner as in Example 52 except that the aqueous sizing agent solution of Reference Example 61 (a-61) was adjusted to have a concentration of 1.2%. The deposition amount of the sizing agent was 0.7% by mass. The property evaluations of the carbon fiber bundle obtained are collectively shown in Table 4.

Comparative Example 1

A chopped fiber was obtained in the same manner as in Example 1 except using the sizing agent of Reference Example 14 (a-14) as an aqueous sizing agent solution. Although the carbon fiber bundle obtained was slightly stiff and could hardly be wound around a bobbin, it was handleable. The property evaluations of the carbon fiber bundle obtained are collectively shown in Table 5. The absence of BHET resulted in that the dispersibility was deficient when the bulk density of the carbon fiber bundle and the concentration of the carbon fiber bundle were increased.

Comparative Example 2

A chopped fiber was obtained in the same manner as in Example 1 except using the sizing agent of Reference Example 15 (a-15) as an aqueous sizing agent solution. The carbon fiber bundle obtained had no problem with windability around a bobbin, fluffs, or the like and had good handleability. The property evaluations of the carbon fiber bundle obtained are collectively shown in Table 5. The deficient amount of the aromatic ester unit resulted in deficient bulk density.

Comparative Example 3

A chopped fiber was obtained in the same manner as in Example 1 except using the sizing agent of Reference Example 16 (a-16) as an aqueous sizing agent solution. The carbon fiber bundle obtained had no problem with windability around a bobbin, but fluffs were observed here and there in the fiber bundles, resulting in reduced handleability. The property evaluations of the carbon fiber bundle obtained are collectively shown in Table 5. The deficient amount of the aromatic ester unit and the aromatic urethane unit resulted in deficient bulk density.

Comparative Example 4

A chopped fiber was obtained in the same manner as in Example 1 except using the sizing agent of Reference Example 17 (a-17) as an aqueous sizing agent solution. The carbon fiber bundle obtained had no problem with windability around a bobbin, fluffs, or the like and had good handleability. The property evaluations of the carbon fiber bundle obtained are collectively shown in Table 5. The excess amount of the aromatic ester unit and the aromatic urethane unit decreased dispersibility.

Comparative Example 5

In an aqueous solution obtained by adjusting the aqueous sizing agent solution of Reference Example 18 (a-18) to have a concentration of 3.5%, a carbon fiber continuous bundle (T700S available from TORAY INDUSTRIES, INC.) was immersed for deposition of the sizing agent and dried with a hot-air dryer at 200° C. for 2 minutes. The sizing agent-deposited carbon fiber bundle obtained was cut to 6 mm length to obtain a chopped fiber. The deposition amount of the sizing agent deposited on the chopped fiber obtained was 2.2% by mass. The carbon fiber bundle obtained had no problem with windability around a bobbin, fluffs, or the like and had good handleability. The property evaluations of the carbon fiber bundle obtained are collectively shown in Table 5. The carbon fiber bundle obtained had poor dispersibility, and deficiency of dispersibility was significant especially at high concentration.

Comparative Example 6

According to Example 1 in Patent Document 4 (JP 2007-231441 A), a chopped fiber was obtained in the same manner as in Example 1 using HYDRAN AP-40 (available from DIC Corporation, 22.5% suspension) as a sizing agent. Although the carbon fiber bundle obtained was quite stiff, it was handleable. The property evaluations of the carbon fiber bundle obtained are collectively shown in Table 5. The carbon fiber bundle obtained exhibited little or no dispersibility.

Comparative Example 7

According to Example 2 in Patent Document 4 (JP 2007-231441 A), a chopped fiber was obtained in the same manner as in Comparative Example 6 except that HYDRAN AP-30F (available from DIC Corporation, 20% suspension) was used as a sizing agent. Although the carbon fiber bundle obtained was quite stiff, it was handleable. The property evaluations of the carbon fiber bundle obtained are collectively shown in Table 5. The carbon fiber bundle obtained exhibited little or no dispersibility.

Comparative Example 8

According to Example 3 in Patent Document 4 (JP 2007-231441 A), a chopped fiber was obtained in the same manner as in Comparative Example 6 except that HYDRAN AP-20 (available from DIC Corporation, 29.5% suspension) was used as a sizing agent. Although the carbon fiber bundle obtained was quite stiff, it was handleable. The property evaluations of the carbon fiber bundle obtained are collectively shown in Table 5. The carbon fiber bundle obtained exhibited little or no dispersibility.

Comparative Example 9

According to Example 4 in Patent Document 4 (JP 2007-231441 A), a chopped fiber was obtained in the same manner as in Comparative Example 6 except that HYDRAN HW-140SF (available from DIC Corporation, 25% suspension) was used as a sizing agent. Although the carbon fiber bundle obtained was quite stiff, it was handleable. The property evaluations of the carbon fiber bundle obtained are collectively shown in Table 5. The carbon fiber bundle obtained exhibited little or no dispersibility.

Comparative Example 10

An aqueous sizing agent solution was prepared in the same manner as in Reference Example 1 except using 72.6 parts by weight of PEG (weight-average molecular weight: 10,000), 16.62 parts by weight of BHET, and 10.73 parts by weight of TDI. However, since the amount of BHET was too large, the sizing agent was not dissolved in water, and the sizing agent underwent phase separation, thereby failing to prepare an aqueous solution.

Comparative Example 11

A chopped fiber was obtained in the same manner as in Example 26 except using the sizing agent of Reference Example 53 (a-53) as an aqueous sizing agent solution. The property evaluations of the carbon fiber bundle obtained are collectively shown in Table 6. The absence of BHET resulted in deficient bulk density of the carbon fiber bundle.

Comparative Example 12

A chopped fiber was obtained in the same manner as in Example 26 except using the sizing agent of Reference Example 54 (a-54) as an aqueous sizing agent solution. The property evaluations of the carbon fiber bundle obtained are collectively shown in Table 6. The deficient amount of the aromatic ester unit resulted in deficient bulk density.

Comparative Example 13

A chopped fiber was obtained in the same manner as in Example 26 except using the sizing agent of Reference Example 55 (a-55) as an aqueous sizing agent solution. The property evaluations of the carbon fiber bundle obtained are collectively shown in Table 6. The deficient amount of the aromatic ester unit and the aliphatic urethane unit resulted in deficient bulk density.

Comparative Example 14

A chopped fiber was obtained in the same manner as in Example 26 except using the sizing agent of Reference Example 56 (a-56) as an aqueous sizing agent solution. The property evaluations of the carbon fiber bundle obtained are collectively shown in Table 6. The excess amount of the aromatic ester unit and the aliphatic urethane unit decreased dispersibility.

Comparative Example 15

An aqueous sizing agent solution was prepared in the same manner as in Reference Example 29 except using 75.5 parts by weight of PEG (weight-average molecular weight: 6,200), 12.4 parts by weight of BHET, and 12.2 parts by weight of IPDI. However, the sizing agent was not dissolved in water, and the sizing agent underwent phase separation, thereby failing to prepare an aqueous solution.

Comparative Example 16

A chopped fiber was obtained in the same manner as in Example 52 except using the sizing agent of Reference Example 73 (a-73) as an aqueous sizing agent solution. The property evaluations of the carbon fiber bundle obtained are collectively shown in Table 7. The SP value outside the range resulted in deficient dispersibility especially at high concentration.

Comparative Example 17

A chopped fiber was obtained in the same manner as in Example 52 except using the sizing agent of Reference Example 74 (a-74) as an aqueous sizing agent solution. The property evaluations of the carbon fiber bundle obtained are collectively shown in Table 7. The SP value outside the range resulted in severely deficient dispersibility.

TABLE 2

| Example No. | Sizing agent | Unit mass ratio (% by mass) | | | | | | Average molecular weight of PEG | Thermal weight loss (%) | Deposition amount of sizing agent (% by mass) | Bulk density (g/ml) | Dispersibility | |
|---|---|---|---|---|---|---|---|---|---|---|---|---|---|
| | | Polyoxyalkylene unit | | Aromatic ester unit | | Aromatic urethane unit | | | | | | | High |
| | | PEG | PPG | BHET | m-BHET | TDI | MDI | | | | | Normal | concentration |
| 1 | a-1 | 96.2 | — | 0.99 | — | 2.86 | — | 6200 | C | 2 | B | A | A |
| 2 | a-2 | 93.7 | — | 2.56 | — | 3.72 | — | 6200 | B | 2.3 | A | A | B |
| 3 | a-3 | 89.2 | — | 5.49 | — | 5.31 | — | 6200 | A | 2.6 | A | A | B |
| 4 | a-4 | 85.1 | — | 8.14 | — | 6.76 | — | 6200 | A | 2.6 | A | B | B |
| 5 | a-5 | 96.6 | — | 0.88 | — | 2.55 | — | 7000 | C | 2.1 | C | A | A |
| 6 | a-6 | 90.3 | — | 4.92 | — | 4.76 | — | 7000 | A | 2.5 | A | A | A |
| 7 | a-7 | 80.0 | — | 11.62 | — | 8.43 | — | 7000 | A | 2.7 | B | B | B |
| 8 | a-8 | 97.6 | — | 0.62 | — | 1.80 | — | 10000 | C | 2.1 | C | A | A |
| 9 | a-9 | 93.0 | — | 3.55 | — | 3.43 | — | 10000 | B | 2.5 | A | A | A |
| 10 | a-10 | 90.2 | — | 5.35 | — | 4.44 | — | 10000 | A | 2.6 | A | A | A |
| 11 | a-11 | 85.1 | — | 8.65 | — | 6.28 | — | 10000 | A | 2.6 | B | A | A |
| 12 | a-12 | 96.4 | — | 1.84 | — | 1.78 | — | 20000 | C | 2.1 | C | A | A |
| 13 | a-13 | 91.9 | — | 4.67 | — | 3.39 | — | 20000 | B | 2.4 | A | A | A |
| 14 | a-10 | 90.2 | — | 5.35 | — | 4.44 | — | 10000 | A | 1.5 | A | A | A |
| 15 | a-10 | 90.2 | — | 5.35 | — | 4.44 | — | 10000 | A | 0.8 | C | B | B |
| 16 | a-19 | 89.0 | — | 2.80 | — | 8.20 | — | 2000 | D | 2 | B | B | B |
| 17 | a-20 | 94.2 | — | 1.50 | — | 4.30 | — | 4000 | D | 2.1 | C | A | B |
| 18 | a-21 | 90.6 | — | 3.80 | — | 5.60 | — | 4000 | C | 2.2 | B | B | B |
| 19 | a-22 | 93.6 | — | 3.70 | — | 2.70 | — | 25750 | C | 2.1 | C | A | B |
| 20 | a-23 | 87.2 | — | 7.80 | — | 5.00 | — | 25750 | B | 2.4 | B | B | B |
| 21 | a-24 | 94.7 | — | 3.10 | — | 2.20 | — | 31500 | C | 2.2 | B | B | B |
| 22 | a-25 | 89.3 | — | 6.50 | — | 4.20 | — | 31500 | B | 2.4 | B | A | B |
| 23 | a-26 | — | 96.2 | 0.99 | — | 2.86 | — | 6200 | B | 2.4 | B | B | B |
| 24 | a-27 | 88.2 | — | 5.23 | — | — | 6.62 | 10000 | A | 2.5 | A | B | B |
| 25 | a-28 | 90.2 | — | — | 5.35 | 4.44 | — | 10000 | A | 2.6 | A | A | A |

TABLE 3

| Example No. | Sizing agent | Unit mass ratio (% by mass) | | | | | | Average molecular weight of PEG | Drape value (cm) | Deposition amount of sizing agent (% by mass) | Bulk density (g/ml) | Dispersibility | |
|---|---|---|---|---|---|---|---|---|---|---|---|---|---|
| | | Polyoxyalkylene unit | | Aromatic ester unit | | Aliphatic urethane unit | | | | | | | High |
| | | PEG | PPG | BHET | m-BHET | IPDI | HDI | | | | | Normal | concentration |
| 26 | a-29 | 95.2 | — | 0.98 | — | 3.84 | — | 6200 | 6.7 | 2.1 | C | A | B |
| 27 | a-30 | 92.5 | — | 2.53 | — | 4.97 | — | 6200 | 5.9 | 2.3 | B | A | B |
| 28 | a-31 | 87.6 | — | 5.39 | — | 7.06 | — | 6200 | 4.4 | 2.5 | C | B | B |
| 29 | a-32 | 83.1 | — | 7.95 | — | 8.94 | — | 6200 | 3.5 | 2.6 | C | B | C |
| 30 | a-33 | 95.7 | — | 0.87 | — | 3.42 | — | 7000 | 7.2 | 2.1 | C | A | B |
| 31 | a-34 | 88.8 | — | 4.84 | — | 6.35 | — | 7000 | 9.2 | 2.6 | B | A | A |
| 32 | a-35 | 97.0 | — | 0.62 | — | 2.42 | — | 10000 | 4.9 | 2.6 | C | A | B |
| 33 | a-36 | 91.9 | — | 3.50 | — | 4.60 | — | 10000 | 11 | 2.1 | A | A | A |
| 34 | a-37 | 88.8 | — | 5.27 | — | 5.92 | — | 10000 | 16 | 2.5 | A | A | A |
| 35 | a-38 | 83.2 | — | 8.46 | — | 8.32 | — | 10000 | 6.3 | 2.5 | B | A | B |
| 36 | a-39 | 95.8 | — | 1.83 | — | 2.40 | — | 20000 | 21 | 2.5 | C | A | B |
| 37 | a-40 | 90.8 | — | 4.62 | — | 4.54 | — | 20000 | 18 | 2 | B | A | B |
| 38 | a-41 | 86.4 | — | 2.75 | — | 10.81 | — | 2000 | 5.1 | 2.3 | B | B | C |
| 39 | a-42 | 92.7 | — | 1.47 | — | 5.80 | — | 4000 | 7.7 | 2.3 | C | B | C |
| 40 | a-43 | 88.8 | — | 3.76 | — | 7.40 | — | 4000 | 8.3 | 2.6 | C | B | C |
| 41 | a-44 | 92.7 | — | 3.66 | — | 3.60 | — | 25750 | 22 | 2.3 | C | A | C |
| 42 | a-45 | 85.7 | — | 7.62 | — | 6.66 | — | 25750 | 17 | 2.3 | C | B | C |
| 43 | a-46 | 94.0 | — | 3.03 | — | 2.98 | — | 31500 | 22 | 2.2 | C | B | B |
| 44 | a-47 | 88.0 | — | 6.39 | — | 5.59 | — | 31500 | 19 | 2.1 | C | B | C |
| 45 | a-37 | 88.8 | — | 5.27 | — | 5.92 | — | 10000 | 7.6 | 1.6 | B | A | B |
| 46 | a-37 | 88.8 | — | 5.27 | — | 5.92 | — | 10000 | 2.2 | 0.7 | C | A | C |
| 47 | a-48 | 93.6 | — | 2.56 | — | — | 3.81 | 6200 | 13 | 2.4 | B | B | C |
| 48 | a-49 | 90.2 | — | 4.91 | — | — | 4.87 | 7000 | 17 | 2.4 | B | B | C |
| 49 | a-50 | 90.1 | — | 5.35 | — | — | 4.54 | 10000 | 20 | 2.5 | A | B | C |
| 50 | a-51 | — | 88.8 | 5.27 | — | 5.92 | — | 10000 | 16 | 2.6 | A | B | C |
| 51 | a-52 | 88.8 | — | — | 5.27 | 5.92 | — | 10000 | 17 | 2.6 | A | A | B |

TABLE 4

| Example No. | Sizing agent | Unit mass ratio (% by mass) | | | | | | | | |
|---|---|---|---|---|---|---|---|---|---|---|
| | | Polyol unit | | | | | Diisocyanate | | | |
| | | Polyoxyalkylene unit | | Aromatic ester unit | | Aliphatic ester unit | Aromatic urethane unit | | Aliphatic urethane unit | |
| | | PEG | PPG | BHET | BHEA | BHES | TDI | MDI | HDI | IPDI |
| 52 | a-57 | 91.99 | — | — | — | — | 8.01 | — | — | — |
| 53 | a-58 | 95.83 | — | — | — | — | 4.17 | — | — | — |
| 54 | a-59 | 97.27 | — | — | — | — | 2.73 | — | — | — |
| 55 | a-60 | 97.57 | — | — | — | — | 2.43 | — | — | — |
| 56 | a-61 | 98.29 | — | — | — | — | 1.71 | — | — | — |
| 57 | a-62 | 99.14 | — | — | — | — | 0.86 | — | — | — |
| 58 | a-63 | 99.33 | — | — | — | — | 0.67 | — | — | — |
| 59 | a-64 | 99.45 | — | — | — | — | 0.55 | — | — | — |
| 60 | a-65 | 97.56 | — | — | — | — | — | 2.44 | — | — |
| 61 | a-66 | 98.35 | — | — | — | — | — | — | 1.65 | — |
| 62 | a-67 | — | 98.29 | — | — | — | 1.71 | — | — | — |
| 63 | a-68 | 92.45 | — | 3.53 | — | — | 4.03 | — | — | — |
| 64 | a-69 | 89.55 | — | 4.88 | — | — | 5.57 | — | — | — |
| 65 | a-70 | 92.71 | — | — | 3.26 | — | 4.04 | — | — | — |
| 66 | a-71 | 93.07 | — | — | — | 2.88 | 4.05 | — | — | — |
| 67 | a-72 | 91.43 | — | 3.49 | — | — | — | — | — | 5.08 |
| 68 | a-61 | 98.29 | — | — | — | — | 1.71 | — | — | — |
| 69 | a-61 | 98.29 | — | — | — | — | 1.71 | — | — | — |

| Example No. | Average molecular weight of PEG | SP value (cal/cm3) | Drape value (cm) | Deposition amount of sizing agent (% by mass) | Bulk density (g/ml) | Dispersibility | |
|---|---|---|---|---|---|---|---|
| | | | | | | Normal | High concentration |
| 52 | 2000 | 12.373 | 4.8 | 2.5 | C | A | B |
| 53 | 4000 | 12.370 | 6.5 | 2.7 | B | A | B |
| 54 | 6200 | 12.368 | 6.2 | 2.6 | B | A | A |
| 55 | 7000 | 12.368 | 5.5 | 2.7 | B | A | A |
| 56 | 10000 | 12.367 | 7.3 | 2.6 | B | A | A |
| 57 | 20000 | 12.367 | 11 | 2.6 | B | A | B |
| 58 | 25750 | 12.366 | 9.2 | 2.7 | C | A | B |
| 59 | 31500 | 12.366 | 13.6 | 2.6 | C | A | B |
| 60 | 10000 | 12.300 | 14.4 | 2.5 | B | A | B |
| 61 | 10000 | 11.751 | 16.1 | 2.6 | C | A | B |
| 62 | 10000 | 12.247 | 11.9 | 2.5 | B | A | C |
| 63 | 10000 | 13.113 | 4.9 | 2.7 | A | A | A |
| 64 | 7000 | 13.113 | 6.3 | 2.7 | A | A | A |
| 65 | 10000 | 12.757 | 10.4 | 2.5 | B | A | C |
| 66 | 10000 | 12.886 | 10.5 | 2.5 | B | A | B |
| 67 | 10000 | 11.779 | 11 | 2.1 | A | A | A |
| 68 | 10000 | 12.367 | 6.2 | 1.4 | B | A | B |
| 69 | 10000 | 12.367 | 3.5 | 0.7 | C | B | C |

TABLE 5

| Comparative Example No. | Sizing agent | Unit mass ratio (% by mass) | | | Average molecular weight of PEG | Thermal weight loss (%) | Deposition amount of sizing agent (% by mass) | Bulk density (g/ml) | Dispersibility | |
|---|---|---|---|---|---|---|---|---|---|---|
| | | Polyoxyalkylene unit PEG | Aromatic ester unit BHET | Aromatic urethane unit TDI | | | | | Normal | High concentration |
| 1 | a-14 | 97.7 | 0.00 | 2.33 | 6200 | D | 1.7 | D | A | D |
| 2 | a-15 | 98.1 | 0.28 | 1.61 | 10000 | D | 1.7 | D | A | B |
| 3 | a-16 | 98.8 | 0.31 | 0.91 | 20000 | D | 1.8 | D | B | D |
| 4 | a-17 | 69.5 | 17.67 | 12.83 | 4000 | B | 2.3 | B | C | D |
| 5 | a-18 | — | — | — | — | D | 2.2 | B | B | D |
| 6 | HYDRAN AP-40 | — | — | — | — | — | 2.5 | C | D | D |
| 7 | HYDRAN AP-30 F | — | — | — | — | — | 2.6 | C | D | D |
| 8 | HYDRAN AP-20 | — | — | — | — | — | 2.5 | C | D | D |
| 9 | HYDRAN HW140SF | — | — | — | — | — | 2.5 | C | D | D |

TABLE 6

| Comparative Example No. | Sizing agent | Unit mass ratio (% by mass) Polyoxyalkylene unit PEG | Aromatic ester unit BHET | Aliphatic urethane unit IPDI | Average molecular weight of PEG | Drape value (cm) | Deposition amount of sizing agent (% by mass) | Bulk density (g/ml) | Dispersibility Normal | Dispersibility High concentration |
|---|---|---|---|---|---|---|---|---|---|---|
| 11 | a-53 | 96.9 | 0.00 | 3.13 | 6200 | 21 | 1.7 | D | B | C |
| 12 | a-54 | 97.6 | 0.28 | 2.17 | 10000 | 10 | 1.8 | D | B | C |
| 13 | a-55 | 98.5 | 0.31 | 1.23 | 20000 | 1.9 | 1.8 | D | B | C |
| 14 | a-56 | 77.6 | 11.28 | 11.09 | 7000 | 9.9 | 2.5 | B | C | D |

TABLE 7

| Comparative Example No. | Sizing agent | Polyol unit Polyoxyalkylene unit PEG | Polyol unit Aliphatic ester unit BHET | Diisocyanate Aromatic urethane unit TDI | Diisocyanate Aliphatic urethane unit IPDI | Average molecular weight of PEG |
|---|---|---|---|---|---|---|
| 16 | a-73 | 97.83 | — | — | 2.17 | 10,000 |
| 17 | a-74 | 71.28 | 16.31 | 12.41 | — | 10,000 |

| Comparative Example No. | SP value (cal/cm³) | Drape value (cm) | Deposition amount of sizing agent (% by mass) | Bulk density (g/ml) | Dispersibility Normal | Dispersibility High concentration |
|---|---|---|---|---|---|---|
| 16 | 11.034 | 12.1 | 2.6 | C | B | D |
| 17 | 13.485 | 9.8 | 2.7 | B | D | D |

The following is clear from Examples in Table 2 and Comparative Examples in Table 5.

Specifically, in the case of the sizing agents shown in Examples in which the polyoxyalkylene unit, the aromatic ester unit, and the aromatic urethane unit are appropriately combined, the carbon fiber bundle simultaneously achieves bulk density and dispersibility and exhibits good dispersibility even when the concentration of the carbon fiber bundle has been particularly increased. Further, it has been revealed that when the carbon fiber bundle having excellent heat resistance is obtained, it also has excellent bulk density.

The following is clear from Examples in Table 3 and Comparative Examples in Table 6.

Specifically, in the case of the sizing agents shown in Examples in which the polyoxyalkylene unit, the aromatic ester unit, and the aliphatic urethane unit are appropriately combined, the carbon fiber bundle simultaneously achieves bulk density and dispersibility and exhibits good dispersibility even when the concentration of the carbon fiber bundle has been particularly increased. Further, it can be said that a carbon fiber bundle having excellent handleability that is easily wound around a bobbin and has little fluff has been obtained because the drape value is controlled within the appropriate range.

Further, the measurement of the eluted amount of a sizing agent was carried out in order to confirm that a film using water soluble polyurethane has excellent dispersibility in an aqueous dispersion medium. The results are shown in Table 8. The water soluble sizing agent is eluted in water at a constant rate, and a large portion is eluted in 5 minutes; it can be seen that the films formed with the sizing agent exhibit water solubility. In other words, it is thought that the carbon fiber bundles shown in Examples were provided with high dispersibility because the water solubility of the sizing agent was appropriately controlled. On the other hand, in Comparative Examples 6 to 9, the eluted amount is small even when the filter paper on which the sizing agent has been deposited is immersed in water for 5 minutes, and it can be seen that the film once formed is slightly soluble in water. In other words, it is thought that because of the low water solubility of the sizing agent, the fiber bundles were deficient in affinity for water, and therefore the fiber bundles were not dispersed and exhibited little dispersibility.

TABLE 8

| | Eluted amount of sizing agent (wt %) After 1 min | Eluted amount of sizing agent (wt %) After 5 min |
|---|---|---|
| Example 53 | 55 | 100 |
| Example 56 | 54 | 96 |
| Example 64 | 40 | 84 |
| Comparative Example 6 | 8 | 12 |
| Comparative Example 7 | 12 | 16 |
| Comparative Example 8 | 10 | 19 |
| Comparative Example 9 | 1 | 9 |

The following is clear from Examples in Table 4 and Comparative Examples in Table 7 and Table 8.

Specifically, in the case of the polyurethane-based sizing agent shown in Examples which has an appropriately controlled SP value, the handleability, convergence property, and dispersibility of the carbon fiber are controlled in a balanced manner, and good dispersibility is exhibited even when the concentration of the carbon fiber bundle has been particularly increased. Further, it can be said that a carbon fiber bundle having excellent handleability that is easily wound around a bobbin and has little fluff has been obtained because the drape value is controlled within the appropriate range.

INDUSTRIAL APPLICABILITY

The carbon fiber bundle on which the sizing agent of the present invention is deposited has excellent convergence property and dispersibility in an aqueous dispersion medium and therefore provides a carbon fiber sheet achieving uniform dispersion at a single fiber level through a paper-making process. The carbon fiber sheet can be suitably utilized, for example, in electrode materials, planar heating elements, and antistatic sheets. In addition, a carbon fiber composite material having excellent mechanical property and electrical conductive property can be produced using a known resin as a base material.

DESCRIPTION OF SYMBOLS

1: Carbon fiber bundle
2: Rectangular parallelepiped base
3: Drape value

The invention claimed is:

1. A carbon fiber bundle having carbon fibers and a sizing agent, wherein said sizing agent comprises a polyurethane resin composed of the component shown in (A) and the component shown in (B1) or (B2) below, and the sizing agent is deposited on said carbon fibers at a rate of 0.5 to 7% by mass:
   (A) 73 to 98% by mass of a polyoxyalkylene unit;
   (B1) 0.5 to 15% by mass of an aromatic ester unit, 1.5 to 10% by mass of an aromatic urethane unit; and
   (B2) 0.5 to 10% by mass of an aromatic ester unit, 1.5 to 11% by mass of an aliphatic urethane unit.

2. The carbon fiber bundle according to claim 1, wherein said polyurethane resin is composed of 85 to 97% by mass of a polyoxyalkylene unit, 0.8 to 9% by mass of an aromatic ester unit, and 2.3 to 6.5% by mass of an aromatic urethane unit.

3. The carbon fiber bundle according to claim 1, wherein said polyurethane resin is composed of 89 to 94% by mass of a polyoxyalkylene unit, 3 to 6% by mass of an aromatic ester unit, and 3 to 5% by mass of an aromatic urethane unit.

4. The carbon fiber bundle according to claim 2, wherein said aromatic urethane unit comprises tolylene diisocyanate.

5. The carbon fiber bundle according to claim 1, wherein the thermal weight loss of said sizing agent after 15 minutes at 230° C. is not more than 30%.

6. The carbon fiber bundle according to claim 1, wherein said polyurethane resin is composed of 78 to 98% by mass of a polyoxyalkylene unit, 2.5 to 9% by mass of an aromatic ester unit, and 4.5 to 8.5% by mass of an aliphatic urethane unit.

7. The carbon fiber bundle according to claim 6, wherein said polyurethane resin is composed of 83 to 97% by mass of a polyoxyalkylene unit, 3 to 6% by mass of an aromatic ester unit, and 4.5 to 6.5% by mass of an aliphatic urethane unit.

8. The carbon fiber bundle according to claim 6, wherein said aliphatic urethane unit comprises isophorone diisocyanate.

9. The carbon fiber bundle according to claim 1, wherein said polyoxyalkylene unit comprises a polyalkylene glycol having a weight-average molecular weight from 4,000 to 21,000.

10. The carbon fiber bundle according to claim 1, wherein said polyoxyalkylene unit comprises polyethylene glycol.

11. The carbon fiber bundle according to claim 1, wherein said aromatic ester unit comprises bis(2-hydroxyethyl) terephthalate or bis(2-hydroxyethyl)isophthalate.

12. The carbon fiber bundle according to claim 1, having a drape value of 2 to 20 cm.

13. The carbon fiber bundle according to claim 1, wherein said carbon fiber bundle comprises 1,000 to 60,000 single fibers.

14. The carbon fiber bundle according to claim 1, wherein said carbon fiber bundle is a chopped fiber having a fiber length of 1 to 20 mm.

15. The carbon fiber bundle according to claim 1, wherein said sizing agent comprises a water soluble polyurethane resin having an SP value of 11.2 to 13.3, and the sizing agent is deposited on said carbon fibers at a rate of 0.5 to 7% by mass.

* * * * *